(12) United States Patent
Kuo et al.

(10) Patent No.: US 8,458,025 B2
(45) Date of Patent: Jun. 4, 2013

(54) SYSTEM FOR GENERATING SCORES RELATED TO INTERACTIONS WITH A SERVICE PROVIDER PARTNER

(75) Inventors: Calvin Kuo, Pasadena, CA (US); Craig Auzenne, Lake Forest, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1700 days.

(21) Appl. No.: 11/698,507

(22) Filed: Jan. 26, 2007

(65) Prior Publication Data
US 2008/0154666 A1 Jun. 26, 2008

Related U.S. Application Data

(63) Continuation of application No. 11/644,586, filed on Dec. 21, 2006.

(51) Int. Cl.
*G06Q 30/00* (2012.01)

(52) U.S. Cl.
USPC ..................... 705/14.2; 705/14.19

(58) Field of Classification Search
USPC ....................................... 705/14, 1
See application file for complete search history.

(56) References Cited

U.S. PATENT DOCUMENTS

| | | | |
|---|---|---|---|
| 5,819,226 A * | 10/1998 | Gopinathan et al. | 705/44 |
| 7,089,592 B2 * | 8/2006 | Adjaoute | 726/25 |
| 2002/0133721 A1 | 9/2002 | Adjaoute | |
| 2005/0125434 A1 * | 6/2005 | Fan et al. | 707/102 |
| 2007/0005417 A1 * | 1/2007 | Desikan et al. | 705/14 |
| 2007/0129999 A1 * | 6/2007 | Zhou et al. | 705/14 |

OTHER PUBLICATIONS

Bouckaert "Bayesian Network Classifiers in Weka", pp. 1-23, Sep. 1, 2004.
"Weka 3—Data Mining with Open Source Machine Learning Software in Java", *WEKA The University of Waikato*, 4 pages, http://www.cs.waikato.ac.nz/ml/weka/, last visited Feb. 9, 2007.
"Example continued . . . K-Means Algorithm-2", pp. 1-2 http://www.ucl.ac.uk/oncology/MicroCore/HTML_resource/KMeans_Algo2.htm, last visited Feb. 9, 2007.
"Example continued . . . K-Means Algorithm-1", pp. 1-2 http://www.ucl.ac.uk/oncology/MicroCore/HTML_resource/KMeans_Algo1.htm, last visited Feb. 9, 2007.
"Example K-Means Clustering Example", http://www.ucl.ac.uk/oncology/MicroCore/HTML_resource/KMeans_Example.htm, 1 page, last visited Feb. 9, 2007.
"Example continued . . . K-Means Algorithm-3", http://www.ucl.ac.uk/oncology/MicroCore/HTML_resource/KMeans_Algo3.htm, 1 page, last visited Feb. 9, 2007.
Kirkby et al., "WEKA Explorer User Guide for Version 3-4", *The University of Waikato*, pp. Cover, 1-12, Jan. 26, 2007.

(Continued)

*Primary Examiner* — Afaf Osman Bilal Ahmed
(74) *Attorney, Agent, or Firm* — Brinks Hofer Gilson & Lione

(57) ABSTRACT

A system is disclosed for generating scores related to interactions with a service provider partner. A historical dataset corresponding to a historical behavior of a set of service provider partners may be identified. The historical dataset may be processed to identify a feature vector. A classifier model may be generated from the historical dataset and the feature vector. Current service provider partner data representing a current service provider partner may be collected. The current service provider partner data may be processed to generate a current service provider partner feature vector. A score may be generated by applying the classifier model to the current service provider partner data feature vector.

21 Claims, 19 Drawing Sheets

OTHER PUBLICATIONS

Scuse et al., "WEKA Experimenter Tutorial for Version 3-4", *The University of Waikato*, pp. Cover, 1-39, Jan. 26, 2007.

Moore, "Statistical Data Mining Tutorials Tutorial Slides", http://www.autonlab.org/tutorials/, pp. 1-6, last visited Mar. 21, 2007.

"C4.5 Algorithm", *Wikipedia, the free encyclopedia*, pp. 1-3, http://en.wikipedia.org/wiki/C4.5, last visited Oct. 19, 2006.

"En:Primer (3.4.6)", *WekaDoc*, http://weka.sourceforge.net/wekadoc/index.php/en%3APrimer, pp. 1-12, last visited Oct. 19, 2006.

"Naïve Bayes classifier", *Wikipedia, the free encyclopedia*, pp. 1-6, http://en.wikipedia.org/wiki/Naive_Bayes_classifier, last visited Oct. 19, 2006.

"Hierarchical classifier", *Wikipedia, the free encyclopedia*, pp. 1-3, http://en.wikipedia.org/wiki/Hierarchical_classifier, last visited Oct. 19, 2006.

"Machine learning", *Wikipedia, the free encyclopedia*, pp. 1-6, http://en.wikipedia.org/wiki/Machine_learning, last visited Oct. 19, 2006.

"ID3 algorithm", *Wikipedia, the free encyclopedia*, pp. 1-2, http://en.wikipedia.org/wiki/ID3_algorithm, last visited Oct. 19, 2006.

Davies et al, "Bayesian Networks: Independencies and Inference", pp. 1-21, http://www.autonlab.org/tutorials/bayesinf05.pdf, last visited Mar. 21, 2007.

Bennet et al, "Exploiting Unlabeled Data in Ensemble Methods", *Proceedings of the Eighth ACM International Conference on Knowledge Discovery and Data Mining*, 8 pages, 2002.

Moore, "Support Vector Machines", *Andrew W. Moore*, School of Computer Science, Carnegie Mellon University,pp. 1-33, 2001, 2003, http://www.autonlab.org/tutorials/svm15.pdf, last visited Mar. 21, 2007.

Moore, "K-means and Hierarchical Clustering", *Andrew W. Moore*, School of Computer Science, Carnegie Mellon University, pp. 1-24, 2001, 2004, http://www.autonlab.org/tutorials/kmeans11.pdf, last visited Mar. 21, 2007.

Moore, "Bayes Nets for representing and reasoning about uncertainty", *Andrew W. Moore*, School of Computer Science, Carnegie Mellon University, 46 pages, 2001, http://www.autonlab.org/tutorials/bayesnet09.pdf, last visited Mar. 21, 2007.

Zhou, "Learning from Labeled and Unlabeled Data Using Random Walks", Max Planck Institute for Biological Cybernetics, 8 pages.

Witten et al., "WEKA Machine Learning Algorithms in Java", *Data Mining: Practical Machine Learning Tools and Techniques with Java Implementation*, pp. Cover, 265-320, Back, 2000.

Moore, "Cross-validation for detecting and preventing overfitting", *Andrew W. Moore*, School of Computer Science, Carnegie Mellon University, 63 pages, http://www.autonlab.org/tutorials/overfit10.pdf, last visited Oct. 19, 2006.

Moore, "Information Gain", *Andrew W. Moore*, School of Computer Science, Carnegie Mellon University, pp. 1-10, 2001-2003, http://www.autonlab.org/tutorials/infogain11.pdf, last visited Mar. 21, 2007.

Moore, "Probabilistic and Bayesian Analytics", *Andrew W. Moore*, School of Computer Science, Carnegie Mellon University, pp. 1-58, http://www.autonlab.org/tutorials/prob18.pdf, last visited Oct. 19, 2006.

Moore, "Decision Trees", *Andrew W. Moore*, School of Computer Science, Carnegie Mellon University, pp. 1-51, http://www.autonlab.org/tutorials/dtree18.pdf, last visited Oct. 19, 2006.

Giannotti et al., "Knowledge discovery & data mining: Classification", *UCLA CS240A Winter 2002 Notes*, EDBT2000, pp. 1-49, 2000.

Callan, "95-779: Text Data Mining Automatic Classification", *Jamie Callan, Carnegie Mellon University*, pp. 1-44, 2004.

Quinlan, "Induction of Decision Trees", *Machine Learning*, pp. 81-106, 1986.

Maclin et al., "An Empirical Evaluation of Bagging and Boosting", *The Fourteenth National Conference on Artificial Intelligence*, 6 pages,1997.

Burges, "A Tutorial on Support Vector Machines for Pattern Recognition", *Data Mining and Knowledge Discovery*, pp. 1-43, 1998.

Blum et al, "Selection of Relevant Features and Examples in Machine Learning", To appear in the special issue of *Artificial Intelligence on 'Relevance'*, R. Greiner and D. Subramanian, Also affiliated with the *Intelligent Systems Laboratory, Daimler-Benz Research and Technology Center*, pp. Cover and 1-23.

"Decision tree", *Wikipedia, the free encyclopedia*, pp. 1-7, http://en.wikipedia.org/wiki/Decision_tree, last visited Oct. 19, 2006.

"Linear classifier", *Wikipedia, the free encyclopedia*, pp. 1-2, http://en.wikipedia.org/wiki/Linear_classifier, last visited Oct. 19, 2006.

"Centroid", *Wikipedia, the free encyclopedia*, pp. 1-3, http://en.wikipedia.org/wiki/Centroid, last visited Oct. 19, 2006.

"K-means algorithm", *Wikipedia, the free encyclopedia*, pp. 1-2, http://en.wikipedia.org/wiki/Kmeans, last visited Oct. 19, 2006.

"Bayesian spam filtering", *Wikipedia, the free encyclopedia*, pp. 1-3, http://en.wikipedia.org/wiki/Bayesian_filtering, last visited Oct. 19, 2006.

"Classifier (mathematics)", *Wikipedia, the free encyclopedia*, pp. 1-1, http://en.wikipedia.org/wiki/Classifier_%28mathematics%29, last visited Oct. 19, 2006.

"Data clustering", *Wikipedia, the free encyclopedia*, pp. 1-10, http://en.wikipedia.org/wiki/Data_clustering, last visited Oct. 19, 2006.

"Hierarchical Clustering", pp. 1-1, http://www.ucl.ac.uk/oncology/MicroCore/HTML_resource/Hier_Clust.htm, last visited Oct. 19, 2006.

"Heuristic", *Wikipedia, the free encyclopedia*, pp. 1-4, http://en.wikipedia.org/wiki/Heuristic, last visited Oct. 19, 2006.

"A Tutorial on Clustering Algorithms", pp. 1-3, http://www.elet.polimi.it/upload/matteucc/Clustering/tutorial_html/kmeans.html, last visited Oct. 19, 2006.

"Semi-supervised learning", *Wikipedia, the free encyclopedia*, pp. 1-1, http://en.wikipedia.org/wiki/Semi_supervised_learning, last visited Oct. 19, 2006.

"Boosting", *Wikipedia, the free encyclopedia*, pp. 1-2, http://en.wikipedia.org/wiki/Boosting, last visited Oct. 19, 2006.

"A Tutorial on Clustering Algorithms", pp. 1-5, http://www.elet.polimi.it/upload/matteucc/Clustering/tutorial_html/, last visited Oct. 19, 2006.

"Bootstrap aggregating", *Wikipedia, the free encyclopedia*, pp. 1-2, http://en.wikipedia.org/wiki/Bootstrap_Aggregating, last visited Oct. 19, 2006.

"Cross-validation", *Wikipedia, the free encyclopedia*, pp. 1-2, http://en.wikipedia.org/wiki/Cross-validation, last visited Oct. 19, 2006.

"Kullback-Leibler divergence", Wikipedia, the free encyclopedia, pp. 1-7, http://en.wikipedia.org/wiki/Information_gain, last visited Oct. 19, 2006.

"Supervised learning", *Wikipedia, the free encyclopedia*, pp. 1-3, http://en.wikipedia.org/wiki/Supervised_learning, last visited Oct. 19, 2006.

Hauskrecht, "CS 2750 Machine Learning Lecture 12, Naïve Bayes classifier & Evaluation framework", *CS 2750 Machine Learning*, 11 pages, http://www.cs.pitt.edu/~milos/courses/cs2750-Spring04/lectures/class12.pdf, last visited Mar. 21, 2007.

\* cited by examiner

View Advertiser Risk By Account Id

| time view | Daily: ⊙ | Monthly: ○ |
|---|---|---|
| Most Recent time period ⊙ | | |
| Time Period Range ○ | From: | To: |
| algorithm view | Current ⊙ | Experimental ○ |
| view only online accounts | Yes ⊙ | No ○ |
| Change View | Submit | |

| ClientName | AccountId | composite score | accountAge | overall status | security status | Account search term risk score | search term max spend score | search term risk-spend score | search term risk-runRate score | max spend over daily budget | daily run rate over daily budget | Max Card AFS Score | |
|---|---|---|---|---|---|---|---|---|---|---|---|---|---|
| Fraudster, Inc | 12394567 | 35 | 1 | on | ONLINE_UNVERIFIED ▾ / OFFLINE_FRAUDULENT / ONLINE_VERIFIED | 100 | 55 | 22 | 11 | 78 | 121 | 66 | View Details |
| Ebay, Inc | 12378373 | 850 | 922 | on | ONLINE_UNVERIFIED / OFFLINE_UNVERIFIED / ONLINE_HIGH_RISK / OFFLINE_HIGH_RISK | 800 | 920 | 750 | 877 | 657 | 907 | 922 | View Details |
| Ebay, Inc | 73298399 | 750 | 622 | on | | 700 | 820 | 550 | 677 | 757 | 807 | 952 | View Details |
| Joe's Crab Shack | 73298311 | 550 | 822 | on | ONLINE_UNVERIFIED ▾ | 800 | 820 | 680 | 577 | 557 | 607 | 622 | View Details |
| Fred's Marina | 27391931 | 750 | 655 | on | ONLINE_UNVERIFIED ▾ | 770 | 770 | 730 | 777 | 637 | 707 | 722 | View Details |
| Jack's Surf Shop | 10381883 | 650 | 602 | on | ONLINE_UNVERIFIED ▾ | 770 | 720 | 720 | 677 | 557 | 707 | 812 | View Details |

Change Security Status [Submit]

FIG. 8

| | A | B | C | D | E | F | G | H | I | J |
|---|---|---|---|---|---|---|---|---|---|---|
| 19 | Mean/Mode: | 1 | 5 | $221,549.16 | 5.972 | $2,044,564.45 | $329,485.81 | 8.3265 | $16,760.18 | $1,967.53 |
| 20 | Std Devs: | N/A | N/A | $188,244.38 | 4.2318 | $2,029,486.14 | $143,968.11 | 2.5767 | $131,303.50 | $16,299.58 |
| 21 | Cluster 4 | | | | | | | | | |
| 22 | Mean/Mode: | 1 | 5 | $169,324.11 | 2.5491 | $631,371.87 | $243,161.58 | 1.0403 | $1,273.49 | $780.52 |
| 23 | Std Devs: | N/A | N/A | $125,275.93 | 2.1305 | $592,111.02 | $52,883.11 | 1.3998 | $6,953.98 | $6,622.37 |
| 24 | Cluster 5 | | | | | | | | | |
| 25 | Mean/Mode: | 1 | 5 | $942.75 | 1.6753 | $2,787.04 | $1,731.30 | 0.2127 | $6.29 | $6.29 |
| 26 | Std Devs: | N/A | N/A | $14,189.02 | 1.4055 | $12,038.64 | $6,533.14 | 0.4092 | $238.76 | $238.76 |
| 27 | Cluster 6 | | | | | | | | | |
| 28 | Mean/Mode: | 1 | 5 | $71,272.15 | 7.8673 | $938,624.98 | $101,579.34 | 18.7379 | $8,107.20 | $430.16 |
| 29 | Std Devs: | N/A | N/A | $154,011.07 | 5.7013 | $1,769,702.02 | $159,054.29 | 4.6743 | $26,091.36 | $1,139.43 |
| 30 | Cluster 7 | | | | | | | | | |
| 31 | Mean/Mode: | 1 | 5 | $79,593.87 | 2.3 | $253,030.95 | $107,238.87 | 0.4842 | $1,122.58 | $1,045.35 |
| 32 | Std Devs: | N/A | N/A | $64,676.66 | 1.8285 | $221,303.79 | $19,619.83 | 0.7621 | $27,906.31 | $27,900.21 |
| 33 | Cluster 8 | | | | | | | | | |
| 34 | Mean/Mode: | 1 | 5 | $362,281.43 | 53.6237 | $10,410,966.72 | $191,179.23 | 8.3978 | $12,545.21 | $8,349.92 |
| 35 | Std Devs: | N/A | N/A | $633,823.90 | 17.548 | $14,587,926.77 | $204,329.81 | 3.615 | $47,594.52 | $41,931.69 |
| 36 | Cluster 9 | | | | | | | | | |
| 37 | Mean/Mode: | 1 | 5 | $2,784,439.34 | 4.4811 | $16,418,508.36 | $3,711,254.34 | 1.4773 | $34,262.91 | $28,883.92 |
| 38 | Std Devs: | N/A | N/A | $2,884,764.95 | 5.2893 | $20,644,552.16 | $902,382.29 | 3.0595 | $390,089.96 | $388,797.51 |
| 39 | Cluster 10 | | | | | | | | | |
| 40 | Mean/Mode: | 1 | 5 | $114,551.60 | 18.4793 | $1,522,980.21 | $79,128.79 | 1.8177 | $4,265.43 | $1,906.32 |
| 41 | Std Devs: | N/A | N/A | $330,096.13 | 5.8601 | $2,099,360.94 | $98,068.67 | 1.9664 | $23,413.62 | $13,632.56 |

FIG. 10

SYSTEM FOR GENERATING SCORES RELATED TO INTERACTIONS WITH A SERVICE PROVIDER PARTNER

CROSS-REFERENCE TO RELATED APPLICATIONS

The present application is a continuation of U.S. patent application Ser. No. 11/644,586, filed Dec. 21, 2006 (pending), which is incorporated by reference herein.

TECHNICAL FIELD

The present description relates generally to a system for generating scores related to interactions with a service provider partner, and more particularly, but not exclusively, for generating scores that may indicate the likelihood of the service provider partner being generating large revenues.

BACKGROUND

Content providers may derive a portion of their revenues from online advertising. The revenue may be generated by revenue generators, such as advertisers, who may pay content providers to have their advertisements displayed to users. The advertiser may maintain a funded account with the content provider through an automated system such as YAHOO!'S SEARCH MARKETING system. The system may deduct funds from the account each time the advertiser incurs a charge, such as when an advertisement of the advertiser is displayed to a user or when a user clicks on the advertiser's advertisement. When the advertiser's account is depleted of all its funds, the system may require the advertiser to replenish their account with additional funds before displaying any further advertisements.

The automated nature of a system, such as YAHOO! SEARCH MARKETING, may simplify the process of displaying ads for an advertiser; however it may also provide fraudulent advertisers with non-traditional venues for defrauding content providers and/or individual users. A fraudulent advertiser may be able to use such an automated system to direct users to scam web sites, such as a "phishing" site, where users are routinely defrauded of their credit card information and/or personal information. Since the user may have been directed to the fraudulent web site by the advertisements displayed by the content provider, the user may associate the content provider with the fraudulent web site, thereby diminishing the general good will of the content provider.

Fraudulent advertisers may also use non-traditional methods to defraud the content providers' systems. The fraudulent advertisers may be able to abuse the systems to rapidly accumulate charges in excess of the amount of funds in their account. If the fraudulent advertiser exceeds a daily budget limit that the content provider agreed to abide by or if the fraudulent advertiser funded their account with a prepaid debit or credit card, the content provider may have no opportunity to receive payment of the excessive charges.

Some current advertising platforms, such as YAHOO! SEARCH MARKETING, may rely on traditional credit verification systems for identifying fraudulent advertisers. A traditional credit verification system may rely on traditional methods in order to identify fraudulent advertisers, such as matching an advertiser's address with the address registered to the credit card used by the advertiser. These traditional credit verification systems may be unable to identify high risk advertisers who are likely to commit the non-traditional types of advertiser fraud mentioned above.

SUMMARY

A system for generating scores relating to interactions with a service provider partner may include: a memory, an interface and a processor. The memory may be able to be to store a classifier model, one or more feature vectors, data relating to historical service provider partners, and data relating to a current service provider partner. The interface may be operatively connected to the memory and may collect data relating to the current service provider partner. The processor may be operatively connected to the memory and the interface. The processor may process the historical service provider partner data to identify a feature vector, may generate a classifier model from the historical dataset and the feature vector, may process the collected current service provider partner data to generate a feature vector associated with the current service provider partner, and may generate a score relating to the service provider partner's behavior by applying the classifier model to the feature vector relating to the current service provider partner.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

Non-limiting and non-exhaustive descriptions are provided with reference to the following drawings. In the drawings, like reference numerals may refer to like parts throughout the various figures unless otherwise specified.

FIG. 8 is a screenshot of an implementation of a monitor interface in the systems of FIG. 1, FIG. 2 and FIG. 3, or other systems for scoring revenue generators.

FIG. 10 is a screenshot of the output of a clustering algorithm run on a historical dataset.

DETAILED DESCRIPTION

A system, and method, generally referred to as a system, relate to detecting fraudulent revenue generators, such as advertisers, and more particularly, but not exclusively, to detecting advertisers who may be likely to commit fraud in an online advertising system.

The principles described herein may be embodied in many different forms. The system may allow an entity to identify revenue generators who may be likely to commit fraud. The system may allow an entity to prevent revenue generator fraud from occurring by identifying and handling revenue generators who may be likely to commit fraud. The system may allow an entity to identify revenue generators who may be likely to generate significant revenue and those who may be likely to generate insignificant revenue. The system may allow an entity to maximize revenue by efficiently identifying and handling revenue generators who are likely to generate significant revenue and those likely to generate insignificant revenue.

Figure 1:
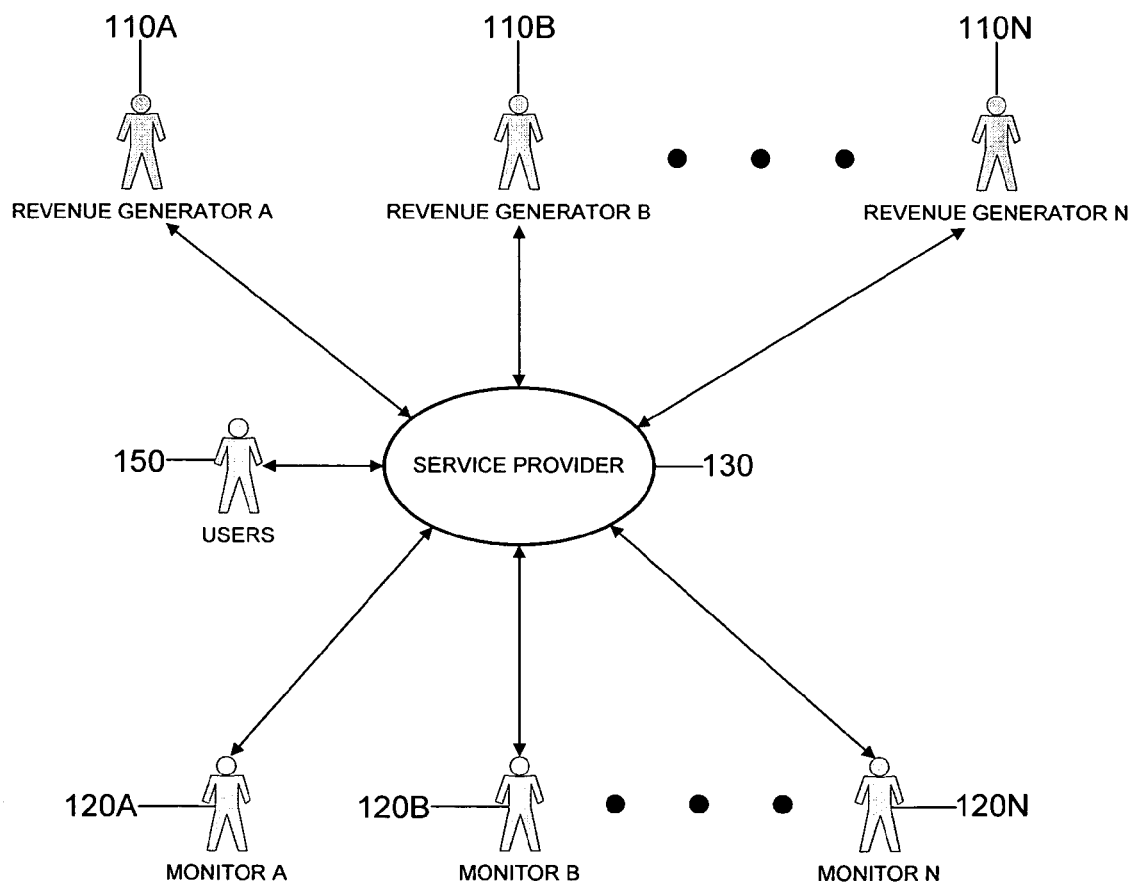
FIG. 1 is a block diagram of a general overview of a system for scoring revenue generators.

FIG. 1 provides a general overview of a system 100 for scoring revenue generators. The system 100 may include one or more revenue generators 110A-N, such as advertisers, a service provider 130, one or more monitors 120A-N and users 150, which may represent one or more users, such as web surfers. The revenue generators in 110A-N may pay the service provider 130 to display ads, such as online ads on a network such as the Internet. The users 150 may interact with the ads of the revenue generators 110A-N displayed by the service provider 130, such as by clicking on an ad. The revenue generators 110A-N may pay the service provider 130 when the users 150 interact with the ads of the revenue generators 110A-N. The payments may be based on various factors, such as the number of ads displayed and/or the number of times a user clicks through to the web site of a revenue generator A 110A.

In the system 100, the revenue generators 110A-N may interact with the service provider 130, such as via a web application. The revenue generator 110A-N may send information, such as billing, website and advertisement information, to the service provider 130 via the web application. The web application may include a web browser or other application such as any application capable of displaying web content. The application may be implemented with a processor such as a personal computer, personal digital assistant, mobile phone, or any other machine capable of implementing a web application. The monitors 120A-N may also interact individually with the service provider 130, such as via a web application. The monitors 120A-N may include administrators of the system, such as an administrator of the system may also perform the functions of the monitors 120A-N. The monitors 120A-N may interact with the service provider 130 via a web based application or a standalone application. The service provider 130 may communicate data to the revenue generators 110A-N and the monitors 120A-N over a network. The following examples may refer to a revenue generator A 110A as an online advertiser; however the system 100 may apply to any revenue generators who interact with a service provider 130, such as service provider partners.

In operation, one of the revenue generators 110A-N, such as revenue generator A 110A, may provide information to the service provider 130. This information may relate to the transaction taking place between the revenue generator A 110A and the service provider 130, or may relate to an account the revenue generator A 110A maintains with the service provider 130. In the case of a revenue generator A 110A who is an online advertiser, the revenue generator A 110A may provide initial information necessary to open an account with the service provider 130. The service provider 130 may use this initial information to make a determination about whether the revenue generator A 110A may be a fraudulent revenue generator. The service provider 130 may provide a venue for the revenue generator A 110A to display their advertisements. Throughout the account life cycle, the service provider 130 may continue to collect information regarding the behavior of the revenue generator A 110A. This information may be used to further refine the determination of whether the revenue generator A 110A may be a fraudulent revenue generator.

A revenue generator A 110A who is an online advertiser may maintain several accounts with the service provider 130. For each account the revenue generator A 110A may maintain several listings. A listing may include a search term, a URL, a bid amount and a rank. The search term may represent a term that the revenue generator A 110A wishes to associate their advertisement with in a search engine environment. The URL may represent the link the revenue generator A 110A wishes the users 150, such as web surfers, to be directed to upon clicking on the advertisement of the revenue generator A 110A, such as the home page of the revenue generator A 110A. The bid amount may represent a maximum amount the revenue generator A 110A may be willing to spend when the users 150 may click on their advertisement or when their advertisement may be shown to the users 150. The rank may be automatically populated by the system 100 and may represent where the bid of the revenue generator A 110A ranks compared to the bids of other revenue generators 110B-N for the same search term.

The revenue generator A 110A may also supply a daily budget for each account, which may represent the maximum amount of charges the service provider 130 may charge to each account on a given day. If this budget value is reached on a given day for a given account, or other period of time identified for the budget, the service provider 130 may stop displaying the advertisements for the given account of the revenue generator A 110A until the next day or until the expiration of some other defined period of time. The daily budget amount, the bid amounts, the search terms bid on and the URL the revenue generator A 110A directs users 150 to may all be collected by the service provider 130 and used to determine if the revenue generator A 110A is likely to be a fraudulent revenue generator. The service provider 130 may continue to collect information on the revenue generator A 110A, such as the average amount of payments made, the total sum of charges accrued in a month, and other values that may be useful in classifying the revenue generator A 110A as a fraudulent or not fraudulent revenue generator.

The service provider 130 may use the data collected from the revenue generator A 110A to determine a score, such as regarding a likelihood of the revenue generator A 110A being a fraudulent revenue generator. For the sake of explanation, the description is described in terms of determining a score regarding the likelihood that the revenue generator A 110A is fraudulent, but the score may be used in other ways, such as to determine revenue generators 110A-N that are not fraudulent. The described system 100 may also be used with entities other than the revenue generators 110A-N. The service provider 130 may take some action based on the score of the revenue generator A 110A, such as taking all of the accounts of the revenue generator A 110A offline, resulting in a freeze in the service provided by the service provider 130 to the revenue generator A 110A. The service provider 130 may output the score of the revenue generator A 110A to one of the monitors 120A-N, such as monitor A 120A. Alternatively or in addition, the service provider 130 may flag the revenue generator A 110A as requiring attention and may notify one of the monitors 120A-N, such as the monitor A 120A, that the revenue generator A 110A requires attention.

Alternatively or in addition to, if the score indicates the revenue provider A 110A may be fraudulent, the service provider 130 may automatically set a risk status value of the account of the revenue generator A 110 to "Unacceptable Offline", the URL associated with the account may be added to a ban list, and the service provider 130 may flag the account for review by one of the monitors 120A-N. Alternatively or in addition to, the URL domain or contact information associated with the account, such as name, address, phone, and email address, may be added to a ban list. If a URL, URL domain or contact information are added to a ban list they may be disassociated from all accounts and may not be associated with accounts in the future. If an account is flagged for monitor review, a monitor A 120A may log into the system 100 and review the account and may determine whether the account was properly scored and whether the account received the proper risk status value. The service provider 130 may also flag an account to be audited by one of the monitors 120A-N.

Furthermore a specific monitor A 120A may be associated with specific revenue generators 110A-N. Alternatively or in addition, multiple monitors 120A-N may be associated with a specific revenue generator A 110A or all the monitors 120A-N may be associated with all revenue generators 110A-N. Any time the service provider 130 communicates with, or notifies a monitor A 120A, the service provider 130 may notify all monitors 120A-N, or may only notify the monitors 120A-N associated with the revenue generator A 110A.

The monitor A 120A may review the score of the revenue generator A 110A and the data of the revenue generator A 110A. The monitor A 120A may take some action based on the score, such as putting the accounts of the revenue generator A 110A online if the monitor A 120A determines that the revenue generator A 110A was improperly identified as a fraudulent revenue generator. Alternatively or in addition, the monitor A 120A may place a ban on the URL used by the revenue generator A 110A from the system 100 if the monitor A 120A determines that the revenue generator A 110A was properly identified as a fraudulent revenue generator. If the monitor A 120A determines that the revenue generator A 110A was improperly scored, the monitor A 120A may notify the service provider 130 that the revenue generator A 110A was improperly scored. Alternatively or in addition, the monitor A 120A may manually modify a security status value associated with the revenue generator A 110A.

Figure 2:
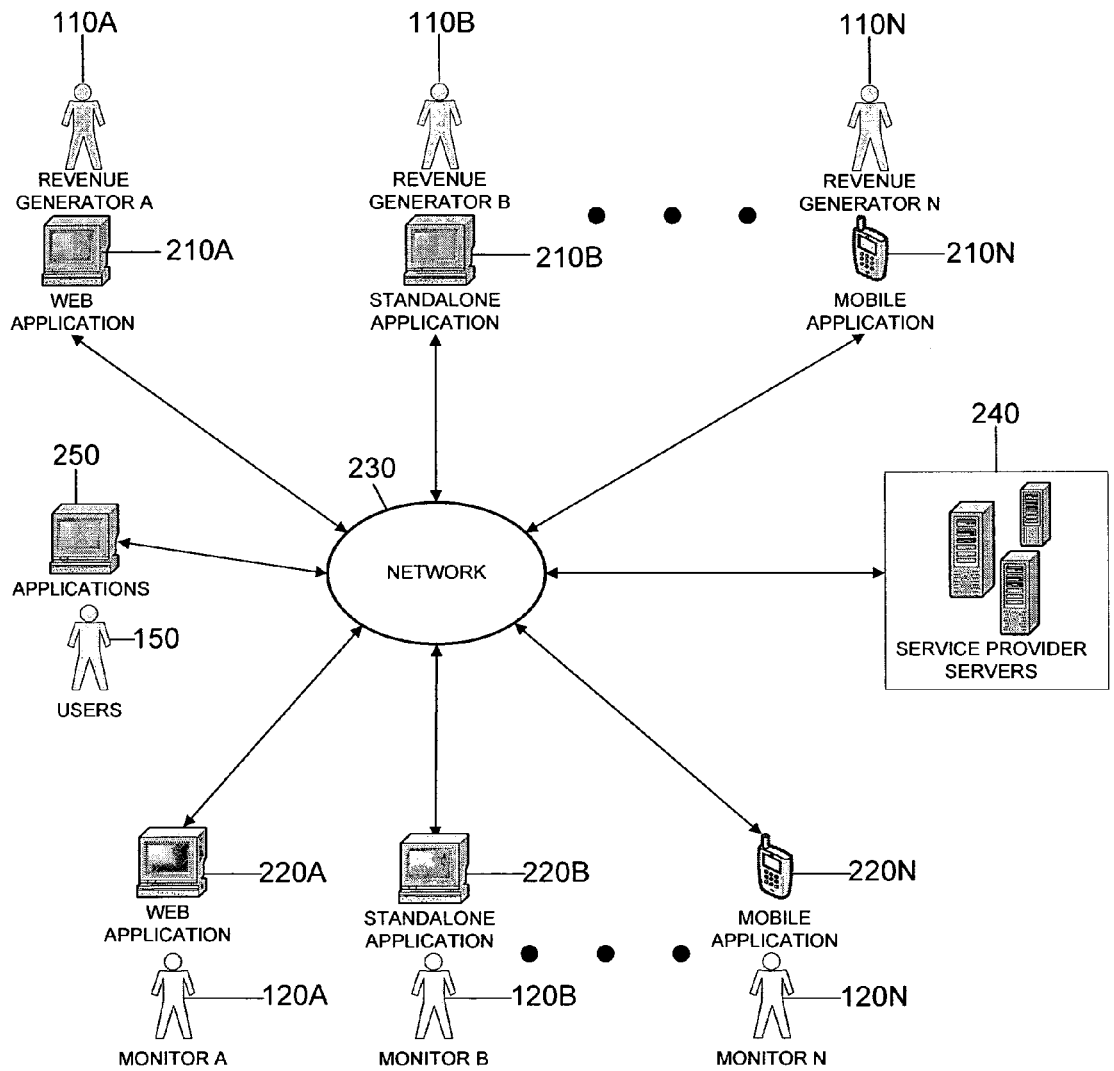
FIG. 2 is a block diagram of a simplified view of a network environment implementing a system for scoring revenue generators.

FIG. 2 provides a simplified view of a network environment implementing a system 200 for determining a score for revenue generators, such as a score relating to a likelihood that a revenue generator 110A-N is fraudulent. The system 200 may include one or more web applications, standalone applications and mobile applications 210A-N, which may be collectively or individually referred to as client applications for the revenue generators 110A-N. The system 200 may also include one or more web applications, standalone applications, mobile applications 220A-N, which may collectively be referred to as client applications for the monitors 120A-N, or individually as a monitor client application. The system 200 may also include one or more applications 150, such as web applications, standalone applications and mobile applications which collectively may be referred to as applications for the users 150, or individually as a user application. The system 200 may also include a network 230, and the service provider servers 240.

The revenue generators 110A-N may use a web application 210A, standalone application 210B, or a mobile application 210N, or any combination thereof, to communicate to the service provider servers 240, such as via the network 230. The network 230 may include wide area networks (WAN), such as the internet, local area networks (LAN), campus area networks, metropolitan area networks, or any other networks that may allow for data communication. Similarly, the monitors 120A-N may use either a web application 220A, a standalone application 220B, or a mobile application 220N to communicate to the service provider servers 240, via the network 230. The service provider servers 240 may communicate to the revenue generators 110A-N via the network 230, through the web applications, standalone applications or mobile applications 210A-N. The service provider servers 240 may also communicate to the monitors 120A-N via the network 230, through the web applications, standalone applications or mobile applications 220A-N.

The users 150 may use one or more applications 250 to communicate to the service provider server 240. The applications 250 may include web applications, standalone applications, or mobile applications. The service provider servers 240 may communicate to the users 150 via the network 230, through the applications 250.

The web applications, standalone applications and mobile applications 210A-N, 220A-N may be connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, or any appliance capable of data communications.

The standalone applications 210B, 220B may run on a machine that may have a processor, memory, a display, and an interface. The processor may be operatively connected to the memory, display and the interface and may perform tasks at the request of the standalone applications 210B, 220B or the underlying operating system. The memory may be capable of storing data. The display may be operatively connected to the memory and the processor and may be capable of displaying information to the revenue generator B 110B or the monitor B 120B. The interface may be operatively connected to the memory, the processor, and the display. The standalone applications 210B, 220B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others. The standalone applications 210B, 220B may be third party standalone applications or may be third party servers.

The mobile applications 210N, 220N may run on any mobile device that may have a data connection. The data connection may be a cellular connection, a wireless data connection, an internet connection, an infra-red connection, a Bluetooth connection, or any other connection capable of transmitting data. The aforementioned descriptions of the web applications, standalone applications and mobile applications may also apply to the applications 250.

The service provider servers 240 may include one or more of the following: an application server, a data source, such as a database server, and a middleware server. The service provider servers 240 may co-exist on one machine or may be running in a distributed configuration on one or more machines. The service provider servers 240 may collectively be referred to as the server.

There may be several configurations of database servers, application servers and middleware servers that may support such a system 200. Database servers may include MICROSOFT SQL SERVER, ORACLE, IBM DB2 or any other database software, relational or otherwise. The application server may be APACHE TOMCAT, MICROSOFT IIS, ADOBE COLDFUSION, YAPACHE or any other application server that supports communication protocols. The middleware server may be any middleware that connects software components or applications.

Figure 3:
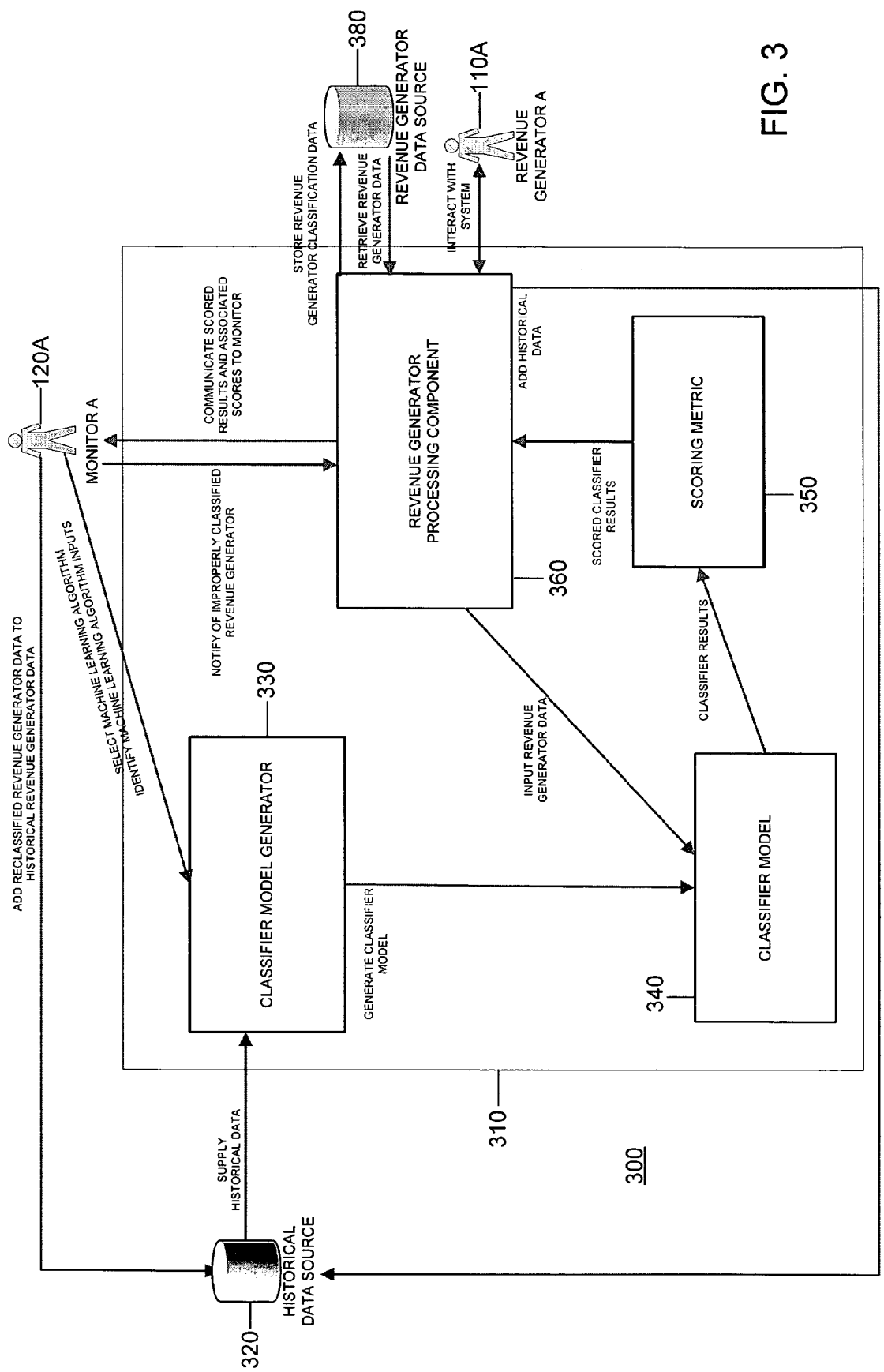
FIG. 3 is a block diagram of a view of a system for scoring revenue generators.

FIG. 3 provides a view of a system 300 that may be used for scoring revenue generators 100, such as the revenue generators 110A-N. The system 300 may include a historical data source 320, a server 310 for classifying revenue generators 110A-N, a revenue generator data source 380, a monitor A 120A and a revenue generator A 110A. The server 310 may include a classifier model generator 330, a classifier model 340, a scoring metric 350, and a revenue generator processing component 360. The server 310, the historical data store 320 and the revenue generator data store 380 may be components of the service provider servers 240. Furthermore the components of the server 310, the classifier model generator 330, the classifier model 340, the scoring metric 350 and the revenue generator processing component 360 may reside on one server or may be distributed across several servers.

The server 310 may run on a machine that may have a processor, memory, a display, and an interface. The processor may be operatively connected to the memory, display and the interface and may perform tasks at the request of the classifier model generator 330, the classifier model 340, the scoring metric 350, the revenue generator processing component 360, or the underlying operating system. The memory may be capable of storing data. The display may be operatively connected to the memory and the processor and may be capable of displaying information to the revenue generator A 110A or the monitor A 120A. The interface may be operatively connected to the memory, the processor, and the display and may be capable of communicating to or interacting with the revenue generator A 110A and the monitor A 120A.

In operation, the historical data source 320 may supply the classifier model generator 330 with historical revenue generator data. The historical revenue generator data may be processed by the classifier model generator 330 to create one or more features, or characteristics, which may be able to describe the behavior of revenue generators 110A-N who have been affirmatively identified as either fraudulent or not fraudulent. The features may be combined into a feature vector. The features or the feature vector may be inputs to the machine learning algorithm.

In the case of a revenue generator A 110A who is an online advertiser, the historical revenue generator data may include any of the aforementioned data values describing online advertisers, such as a bid amount, a search term bid on, a daily budget value, the URL the advertisement directs users 150 to, the change history of the account, the spend history of the account, the spend to replenish ratio of the account, which may represent the amount the revenue generator A 110A spends in relation to the amount the revenue generator A 110A uses to replenish their account, the average amount of payment, the number of times the credit card associated with the account is charged in a month, the total sum of charges accrued in a month, the average account adjustment amount, the credit rating of the account owner, the total number of adjustments, a client run rate representing the amount an advertiser spends on all of their accounts per day and any other data collected that may assist in generating a classifier model 340. Other revenue generators 110A-N, such as service provider partners, may utilize different historical revenue generator datasets.

The historical data may be processed by the classifier model generator 330 to create several features that may describe the behavior of a revenue generator A 110A and may be used as inputs to a machine learning algorithm used to generate the classifier model 340. There may be several features that may be used to describe a revenue generator A 110A. The features may include: a client tier value, a security status value, a risk status value, a client age value represented by the number of days the revenue generator A 110A has maintained an account with the service provider 130, a client search term max-spend-score, a client search term risk score, a client search term risk-spend score, a client risk-run rate score, a client max spend over daily budget score, a client run-rate rate of change score, a client run rate over daily budget score and a client card score.

The features that may be combined into the feature vector may be identified by using clustering, such as K-Means clustering, and other data mining techniques on the historical data or may be identified by manual analysis of the features. The feature selection may be performed on unlabeled data. Forward feature selection or backward feature removal may be used in identifying the features. Forward feature selection may include starting with zero features, adding one feature in each iteration, testing or calculating the information gain of the new set of features in each iteration and selecting the best new feature in each iteration (a local maximum). Backward feature removal include starting with all features, removing one feature each iteration and stopping when the removal of any feature may reduce the information gain by a certain percentage.

A value for each of the features may be calculated periodically, randomly and/or for determined time intervals, such as for the following periods of time: hourly, daily, monthly, or any other time period the monitor A 120A may deem useful in determining whether the revenue generator A 110A is a fraudulent revenue generator. The system 100 may also calculate an exponentially weighted moving average of the set of the last M time period scores, where M may be a number of days (up to and including the previous day) specified by one of the monitors 120A-N. M may represent a number of days or a number of months. Any of the time period values of the features or the exponentially weighted moving average of the features may be used as an input to the machine learning algorithm.

The exponentially weighted moving average may apply weighting factors which decrease exponentially. The weighting for each period of time may decrease exponentially, giving much more importance to recent observations while still not discarding older observations entirely. The degree of weighing decrease may be expressed as a constant smoothing factor $\alpha$, a number between 0 and 1. $\alpha$ may be specified by a monitor A 120A and may be expressed as a percentage; so a smoothing factor of 10% may be equivalent to $\alpha$=0.1. The exponentially weighted moving average may also be referred to as an exponential moving average, or an EMA. An EMA calculation may be a standard statistical calculation and more information may be available at: http://www.itl.nist.gov/div898/handbook/pmc/section4/pmc431.htm.

For each of the aforementioned features and time periods, a number of scores of the features for the given time period may be calculated. The scores may include an absolute score of the feature for the time period, a relative score of the feature for the time period, an absolute rate of change score of the feature for the time period, and a relative rate of change score of the feature for the time period. Any of these scores may be used as inputs to the machine learning algorithm.

The absolute score of each feature may represent the actual calculated score of each feature for the given time period. The relative score may represent a percentile of an absolute score of a feature associated with the revenue generator A 110A, in relation to all other absolute scores for the given feature for the other revenue generators 110B-N. A score of a feature referenced without an identifier, such as "absolute" or "relative," may refer to the absolute score of the feature.

The relative score of each feature may be calculated by multiplying the absolute score of the feature by a percentile. The percentile may represent how the absolute score of the feature of a revenue generator A 110A compares with the absolute scores of all the other revenue generators 110B-N. A percentile calculation may be a standard statistical calculation and more information may be found at: http://www.itl.nist.gov/div898/handbook/prc/section2/prc252.htm.

The rate of change score of each feature may indicate the rate that the value of the feature may change from period to period. The rate of change score may be a positive value or a negative value. To calculate the rate of change score of the feature the monitor A 120A may need to indicate a number of previous time periods, M, to calculate the rate of change score over, where M is greater than 1. The EMA for the feature may then be calculated over the M periods. The rate of change of the feature may be calculated by subtracting the EMA value of the absolute score of feature for the last M time periods from the absolute score of the feature and then dividing the result by the number of periods, M. The rate of change calculations may include calculating derivatives and determining a polynomial equation that best fits the scores of the feature for the time period identified.

The client tier value may describe the value of a revenue generator A 110A may bring to the service provider 130, as identified by a monitor A 120A. The client tier value may also be automatically set by the system 100 based on the amount of revenue the revenue generator A 110A may have generated for the service provider 130. The client tier value may be associated with a text identifier describing the value. The following may be examples of text identifiers associated with client tier values: "Unknown," "New," "Standard," "Premier," "Gold," "24K Gold," "Platinum," "Diamond," "Old," and "Super Diamond." The text identifier may be used to facilitate the monitors 120A-N in interpreting the client tier value.

The security status value may be a nominal value that may relate to the likelihood that a revenue generator A 110A may interact properly or improperly with the service provider 130. The security status value may be identified by a monitor A 120A and may typically only be set by the service provider 130 when a revenue generator A 110A initially signs up, such as when a revenue generator A 110A initially signs up as an advertiser. The security status value may be associated with a text identifier describing the security status value. The following may be examples of text identifiers of the security status value: "Offline Fraudulent," "Online Verified," "Offline Unverified," "Online Verified," "Online High Risk," and "Offline High Risk." Other text identifiers may also be used to describe the security status value of the revenue generators 110A-N.

The risk status value may be a nominal value that may relate to the likelihood that a revenue generator A 110A may interact properly or improperly with the service provider 130. The risk status value may be determined by the service provider 130 based on the transaction history of a revenue generator A 110A. Typically the risk status value may be set automatically by the service provider 130. The risk status value may be associated with a text identifier describing the status. The following may be examples of text identifiers for risk status: "Acceptable Online," "Unacceptable Offline." Other text identifiers may also be used to describe the risk status of the revenue generators 120A-N.

The client age value may represent the number of days since a revenue generator A 110A initially interacted with the service provider 130, such as when the revenue generator A 110A initially signed up to become an advertiser. The client age value may be associated with an account of the revenue generator A 110A.

The client search term max-spend-score may represent the aggregation of all the individual search term max-spend-scores associated with each of the accounts associated with a revenue generator A 110A. The account search term max-spend-score may be calculated by aggregating the individual search term max-spend-scores for each search term bid on in a given account.

An individual search term max-spend score may indicate the maximum amount a revenue generator A 110A may be willing to spend for a search term. This may indicate the spending intentions of the revenue generator A 110A for the search term and not the actual amount spent by the revenue generator A 110A. To calculate the search term max-spend-score for each search term bid on, the service provider server 130 may first need to determine a rank-percent value.

The rank-percent value may be calculated by using a curve to approximate the percentage of clicks one of the revenue generators 110A-N, such as the revenue generator A 110A, may obtain for a given listing based on the listing's rank in the search results. This curve may have the percentage of clicks on the y-axis and the rank on the x-axis. All of the values of the y-axis may add up to 1.0. There may be a curve used for mature markets, where many bids may be submitted for a given search term, and there may be other curves for other stages of market maturity. The individual search term-max spend score may be calculated by multiplying the rank-percent by the bid amount of the revenue generator A 110A for the search term and by the search term's average daily click volume, representing the number of times users 150 may click on an advertisement in a given day after searching for the search term.

A max spend change event may represent an event that makes the search term max-spend-score eligible to be recalculated, such as a bid change, a search term addition, or a search term deletion. The number of max spend change events may represent the total number of max spend change events in a given time period or may represent the average number of max spend change events over the course of a given time period. The number of max spend change events may be a feature.

The client search term risk score may represent the aggregation of all of the search term risk scores associated with each of the accounts of a revenue generator A 110A. The individual search term risk score for a search term may vary according to whether the search term has been associated with any known fraudulent accounts. The value of an individual search term risk score may be 1 if no risk is associated with the search term, or if the search term has been associated with a known fraudulent account the value of the search term risk score may be 1000 multiplied by the number of times the search term has been associated with a known fraudulent account. Alternatively or in addition to, other multipliers may be used, such as 10, or 100. A search term with no risk associated with it, and therefore a search term risk score of 1, may be referred to as a non-risk search term and a search term with risk associated with it may be referred to as a risk search term.

In order to calculate the account search term risk score several initial variables may need to be calculated, which may be defined as: x, y, a, and b. X may be calculated by subtracting the number of search terms in the account that may have been associated with a fraudulent account from the number of risk search terms in the account. Y may be calculated by subtracting the number search terms in the account that have not been associated with a fraudulent account from the number of non-risk search terms in the account. A may be calculated by aggregating both the search term risk score of all the risk search terms in the account and the search term risk score of all of the search terms in the account that may have been associated with a fraudulent account. B may be a configurable value, such as 1.2. The account search term risk score may then be calculated by first raising a to the b power, then adding y to the result, and lastly dividing the sum by the sum of x plus y. This calculation may be mathematically represented as (ab+y)/(x+y), where the symbol "" may represent an exponential operator. The total number of search terms in the account may be equal to x plus y.

The client search term risk-spend score may represent the aggregate of all the account search term risk-spend scores associated with a revenue generator A 110A. The score may intend to measure the combined risk of the search terms of the revenue generator A 110A with the amount of money the revenue generator A 110A may be willing to spend. A revenue generator A 110A who may spend a high dollar amount for high-risk search terms may get a higher score than a revenue generator B 110B who may spend a high dollar amount for low-risk search terms. In order to calculate the account search term risk-spend score for a given account, the classifier model generator 330 may first need to calculate the account search term max-spend-score and a relative account search term risk score. The account search term max-spend-score may be calculated according to the method elaborated above and the relative account search term risk score may be calculated per the method for calculating relative scores elaborated above.

Once the account search term max-spend-score and the relative account search term risk scores have been calculated, the classifier model generator 330 may calculate the account search term risk-spend score. A base and exponent calculation may be used in calculating the account search term risk-spend score. The base value may be equal to the account search term risk score and the exponent may be equal to a configurable value, 'A', such as 1.2.

The account search term risk-spend score may be calculated by raising the base to the power of the exponent and multiplying the result by the account search term max-spend-score. This calculation may be mathematically represented as: account search term-max-spend score*(account search term risk score  A), where the symbol "" represents an exponential operator.

The client search term risk-run rate score may be determined by finding the maximum account search term risk-run rate score for any account associated with a revenue generator A 110A. In order to calculate the account search term risk-run rate score, the account run rate score and the account search term risk score may need to be calculated. The account run rate may be the amount of money a revenue generator A 110A may spend on an account for a given time period, such as a day. In the case of a day time period, the account run rate may be calculated once per day.

Once the account run rate and the account search term risk score have been calculated, the account search term risk-run rate score may be calculated. A base and exponent may be used in calculating the account search term risk-run rate score. The base may represent the account search term risk score and the exponent may represent a configurable value, 'A', such as 1.2. The account search term risk-run rate score may be calculated by raising the base to the power of the exponent and then multiplying the result by the account run rate. This calculation may be mathematically represented as: account run rate*(account search term risk score  A), where the symbol "" represents an exponential operator. A high value for the account search term risk-run rate score may indicate that a client may be willing to spend a relatively high amount of money for a relatively low number of clicks.

The client max spend over daily budget score for a revenue generator A 110A may be calculated by finding the maximum value of the account max spend over daily budget score for any account associated with the revenue generator A 110A. The account max spend over daily budget score may be calculated by using the account search term max-spend-score calculated for the previous day, and the daily time weighted average of the daily budget for the previous day. The daily budget may represent the maximum amount a revenue generator A 110A may be willing to spend for a given account on a given day. A time weighted average of the daily budget may need to be calculated if the budget amount changes over the course of a day. The account max spend over daily budget score may be calculated by dividing the account max-spend-score by the daily budget. The account max-spend-score may indicate what the revenue generator A 110A may be willing to pay for a given account if there were no budget. When the account max spend over daily budget score is very high it may mean that the revenue generator A 110A may be willing to receive very few clicks relative to their budget.

The client run-rate rate of change score may be equal to the maximum value of the account run-rate rate of change score for any account associated with the revenue generator A 110A. Calculating the individual account run-rate rate of change scores may include calculating the exponentially weighted moving average for the daily account run rate for the previous M days, where M is greater than 1. The daily account run rate may be the amount the revenue generator A 110A may spend on the account for a given day, calculated once per day. The account run-rate rate of change scores may then be calculated by subtracting the EMA value of the run rate score from the account run rate value. The client run-rate rate of change calculations may include calculating derivatives and determining a polynomial equation that best fits the client run-rate scores for the given time period.

The client run rate over daily budget score for a revenue generator A 110A may be determined by finding the maximum account run rate over daily budget score for any account associated with the revenue generator A 110A. The account run rate over daily budget score may be calculated by dividing the account run rate by the daily time weighted average daily budget for the account. For example, the account run rate over daily budget score calculation may use the account run rate calculated for the previous day, and the time weighted average of the daily budget of the account for the previous day. The daily budget may represent the maximum amount a revenue generator A 110A may be willing to spend for a given account on a given day.

The client card score may represent the worst credit rating value of any credit card associated with any of the accounts of a revenue generator A 110A. The account card score may represent the worst credit rating value of any credit card associated with a particular account. The credit rating value may be an AFS score, which may be a CYBERSOURCE ADVANCED FRAUD SCREEN credit card transaction score. The value of an AFS score may range between 1 and 99, where 99 may represent a credit card transaction most likely to be fraudulent, and 1 may represent a credit card transaction least likely to be fraudulent, or vice-versa. Other ranges may also be used. The credit rating value may also be supplied by other credit rating metrics, or any other credit card processor. In the case of an AFS score, the client card score may represent the highest card AFS score for any account associated with the revenue generator A 110A.

The historical data may include a data field that classifies the revenue generators 110A-N as fraudulent or not fraudulent. This determination may have been made by one of the monitors 120A-N based on the historical behavior of the revenue generators 110A-N. There may be other values that may be used to identify the revenue generator A 110A, but do not assist in classifying the revenue generator A 110A as fraudulent, such as the account id or account name of the revenue generator A 110A. Furthermore, there may be other features that may assist in classifying a revenue generator A 110A who is an online advertiser that may be identified by the service provider 130 or by one of the monitors 120A-N, such as an account age, an age factor, and a spend to replenish ratio.

The replenish rate may represent the rate the account replenishes its funds, which may be represented by the sum of payments per month divided by the number of payments per month. The run rate may represent the rate at which the account spends its funds. The spend to replenish ratio may represent the amount the revenue generator A 110A spends in relation to the amount the revenue generator A 110A uses to replenish their account.

The classifier model generator 330 may combine the features identified in the historical data or any other features into a feature vector to be submitted as inputs to a machine learning algorithm to generate the classifier model 340. The monitor A 120A or the service provider 130 may identify a machine learning algorithm to be used in generating the classifier model 340, such as a C4.5 algorithm, and may identify which data fields of the revenue generator data may be used in generating the classifier model 340. Other machine learning algorithms may include any decision trees, such as ID3, or C4.5 decision trees, artificial neural networks, pattern recognition with K-nearest neighbor, classifiers, maximum margin classifiers such as a support vector machine, or probability based classifiers, such as a Bayes classifier or a naïve Bayes classifier.

The revenue generator processing component 360 may interact with the revenue generator A 110A, may collect data relevant to the revenue generator A 110A, and may store the collected data in the revenue generator data source 380. The revenue generator processing component 360, may process the collected data relevant to the revenue generator A 110A to create the previously mentioned feature vector to input into the classifier model. The revenue generator processing component 360 may then submit the feature vector or other input data associated with the revenue generator A 110A into the classifier model 340.

The revenue generator processing component 360 may process the data collected from the revenue generator A 110A and input the processed data to the classifier model 340 each time new data is collected relevant to the revenue generator A 110A or in predetermined intervals of time. Alternatively or in addition, another server in the service provider servers 240 may collect data relevant to the revenue generators 110A-N and store the data in a data source. In this case the revenue generator processing component may retrieve data relating to the revenue generators 110A-N directly from the data source.

The classifier model 340 may submit the results of the classification to the scoring metric 350. The results of the classification may include a list of the classes available for classification, such as "fraudulent" or "not fraudulent," and a weight associated with each class. The weight may indicate the likelihood that the data belongs to the class the weight is associated with. The weights may be between 0 and 1 and the aggregate of all the weights may equal 1.

The scoring metric 350 may apply a scoring metric to the classifier results to generate a composite score. The scoring metric 350 may be a metric that converts the classifier results into the composite score. The significance of the composite score may be easily understood by a monitor A 120A. The metric may be a multiplier, such as 1000, that may be applied to a weight of one of the classes, such as the "not fraudulent" class. For example, if the weight associated with the class "not fraudulent" was 0.8, the scoring metric may convert the weight into a score of 800. The scoring metric 350 may use other data associated with the revenue generators 110A-N in converting the classifier results into a score. The scoring metric 350 may obtain the data from the classifier model 340, the revenue generator processing component 360 or directly from the revenue generator data source 380.

For example, the scoring metric 350 may take an average of the classifier results and any combination of the other scores mentioned above. There may be other formulas used to convert the classifier results to a score which may be identified by a monitor A 120A or predetermined by the service provider 130. Any of these formulas may be used to generate the composite score which may be communicated to the revenue generator processing component 360.

The revenue generator processing component 360 may take some action based on the composite score of the revenue generator A 110A. For example, if the composite score is below a certain threshold, the revenue generator processing component 360 may set the risk status value of the revenue generator A 110A to "Unacceptable Offline" and may notify a monitor A 120A that the revenue generator A 110A requires attention. There may be other actions that the revenue generator processing component 360 may automatically perform based on the score of the revenue generator A 110A. After taking any such actions, the revenue generator processing component 360 may communicate the scored classifier results and any other scores associated with the revenue generator A 110A to the monitor A 120A. In some instances the revenue generator processing component 360 may not communicate the scores associated with the revenue generator A 110A to a monitor A 120A.

The monitor A 120A may review the composite score and any other scores associated with the revenue generator A 110A. The monitor A 120A may handle the revenue generator A 110A by updating the security status value of the revenue generator A 110A based on the composite score and other scores of the revenue generator A 110A, such as by changing the security status value of the revenue generator A 110A to "Offline Fraudulent," or by changing a spend limit of the revenue generator. The spend limit may represent the maximum amount the revenue generator A 110A may spend in a given time period, such as a day. There may be one spend limit for the revenue generator A 110A, or there may be a separate spend limit for each account of the revenue generator A 110A.

The monitor A 120A may determine whether the composite score associated with the revenue generator A 110A accurately reflects the revenue generator A 110A's historical behavior. If the monitor A 120A determines that the composite score associated with the revenue generator A 110A does not accurately reflect the behavior of the revenue generator A 110A, the monitor A 120A may add the data associated with the revenue generator A 110A to the historical data source 320, and classify the data as either fraudulent or not fraudulent. The classification of the data may be based on the monitor A 120A's expert opinion regarding the behavior of the revenue generator A 110A. The step of adding the data associated with the revenue generator A 110A to the historical data source 230 may also be performed by the server 310. In this instance the monitor A 120A may only communicate to the server 310 that the revenue generator A 110A may have been improperly classified. The server 310 may execute the remaining steps.

The classifier model generator 330 may then reprocess the historical data from the historical data source 320 and may re-input the processed data into the identified machine learning algorithm. After a new classifier model 340 has been generated, the revenue generator processing component 360 may re-input the data associated with the revenue generator A 110A to the classifier model 340. The new composite score displayed to the monitor A 120A may properly reflect the behavior of the revenue generator A 110A. If the composite score does not accurately reflect the behavior of the revenue generator A 110A, the monitor A 120A may attempt to correct the composite score by modifying the feature vector inputted to the machine learning algorithm, selecting a different machine learning algorithm, or adjusting the scoring metric 350.

Figure 4:
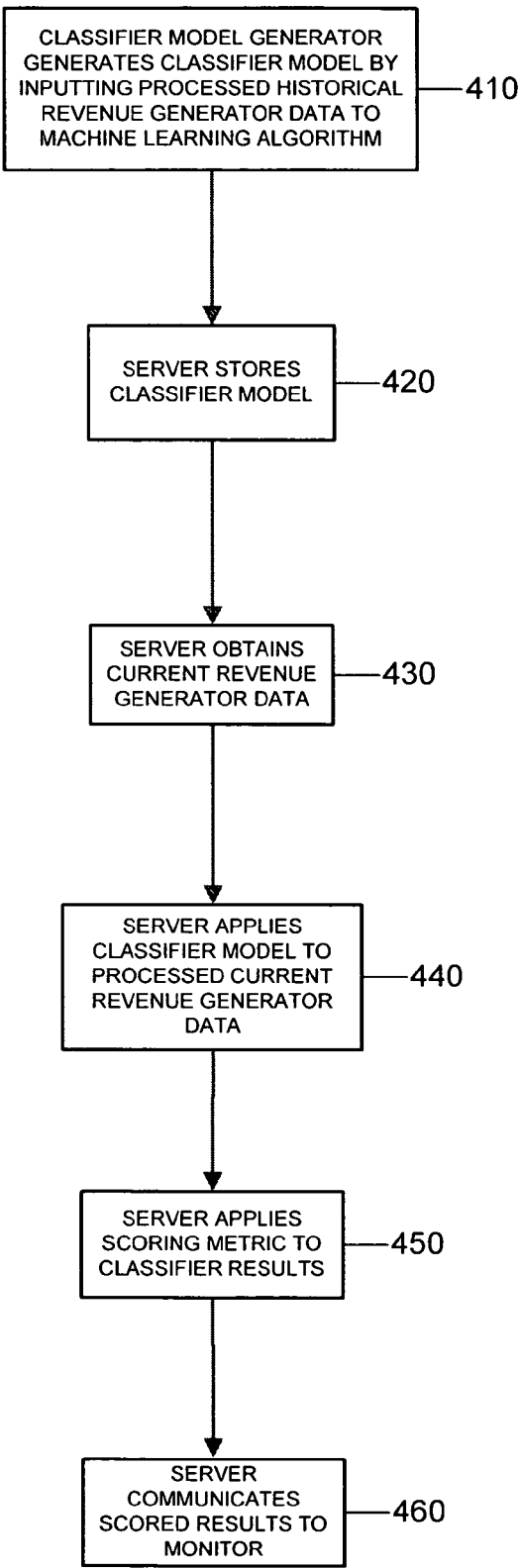
FIG. 4 is a flowchart illustrating basic operations of the systems of FIG. 1, FIG. 2, and FIG. 3 or other systems for scoring revenue generators.

FIG. 4 illustrates basic operations that may be used with the systems of FIG. 1, FIG. 2, FIG. 3 or other systems for scoring revenue generators. At block 410 the classifier model generator 330 may generate a classifier model 340 by inputting processed historical revenue generator data to a machine learning algorithm. The features inputted to the machine learning algorithm may be any of the features enumerated above. The machine learning algorithm may be any of the types of machine learning algorithms enumerated above or any other machine learning algorithm capable of classifying data.

At block 420 the server 310 may store the classifier model 340. At block 430 the server 310 may obtain current revenue generator data from interactions with one of the revenue generators 110A-N, such as revenue generator A 110A. At block 440 the revenue generator processing component 360 may process the data of the revenue generator A 110A to create the inputs to the classifier model 340. The server 310 may then apply the classifier model 340 to the processed data of revenue generator A 110A. At block 450, the server 310 may apply the scoring metric 350 to the results of the classification of the data associated with the revenue generator A 110A. The scoring metric 350 may be in any of the previously enumerated forms, such as a multiplier of 1000 to create a composite score. At block 460 the composite score and any other scores associated with the revenue generator A 110A may be communicated to one of the monitors 120A-N, such as the monitor A 120A. The monitor A 120A may review the scores and perform an action on the revenue generator A 110A, such as changing security status value of the revenue generator A 110A.

Figure 5:
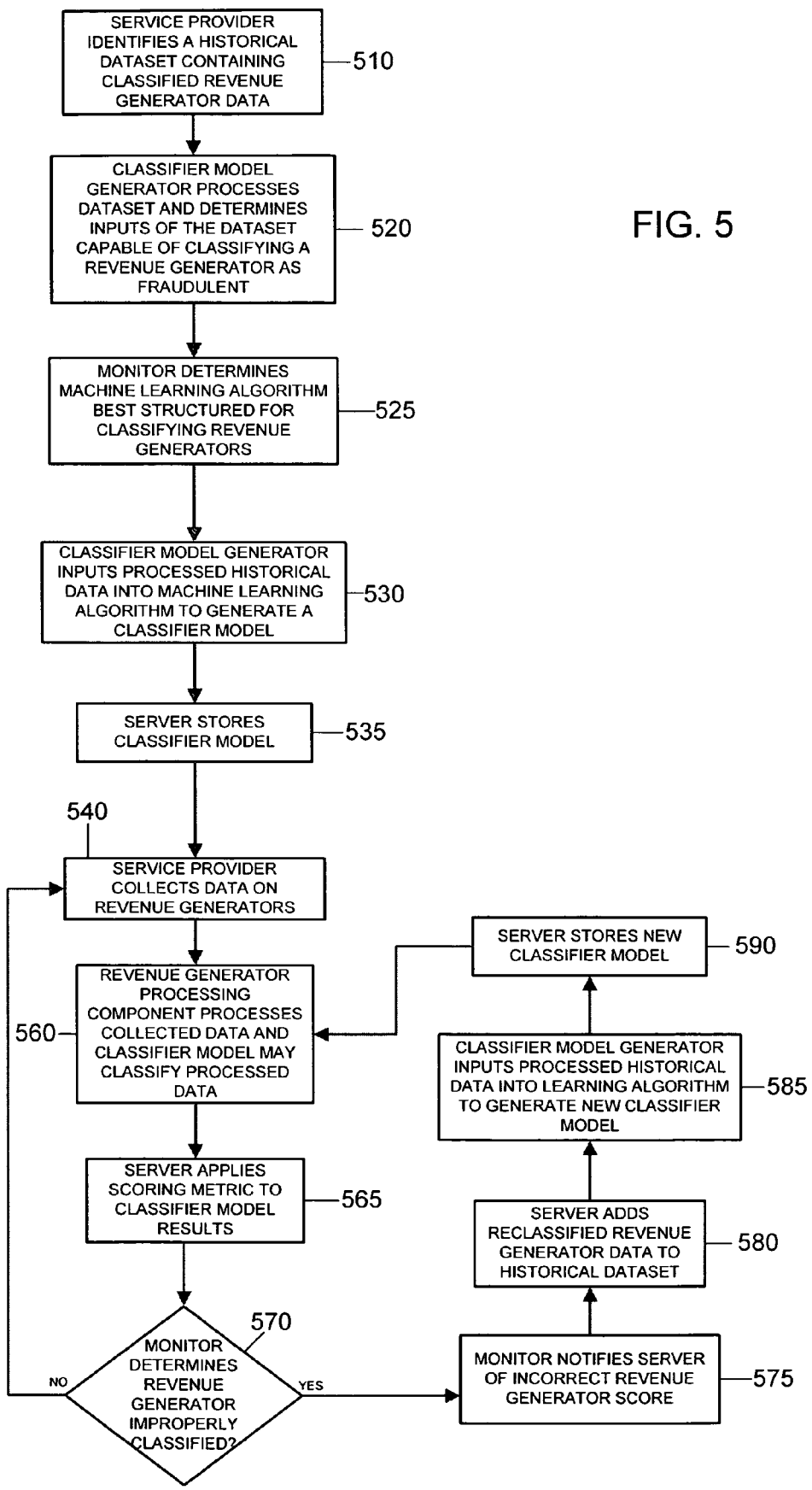
FIG. 5 is a flowchart illustrating in more detail the operations of the systems of FIG. 1 and FIG. 2, and FIG. 3 or other systems for scoring revenue generators.

FIG. 5 further illustrates operations that may be used with the systems of FIG. 1, FIG. 2, FIG. 3 or other systems for scoring revenue generators. At block 510 the server 310 may identify a historical dataset containing revenue generator data that may have been classified by an expert, such as the monitor A 120A. The expert may have classified the revenue generator data based on the historical behavior of the revenue generators. This historical data may be mined from historical revenue generator transaction databases or may be supplied by a third party.

At block 520, the classifier model generator 330 may process the dataset to generate data capable of describing the behavior of the revenue generators 110A-N and accurately classifying the revenue generators 110A-N. The process may further include determining which inputs form clusters by using a clustering algorithm such as the K-Means algorithm. Any combination of the aforementioned scores may be capable of acting as inputs to the machine learning algorithm.

At block 525 the service provider 130 or one of the monitors 120A-N may determine a machine learning algorithm best structured for using the identified inputs to create a classifier model 340 for classifying the revenue generators 110A-N. Each of the machine learning algorithms enumerated above may be capable of classifying the revenue generators 110A-N.

The process of identifying the inputs in block 520 and the process of selecting a machine learning algorithm in block 525 may be coupled together. The process of identifying the proper inputs may be a process of recursively cycling inputs through a machine learning algorithm to determine which inputs maximize the information gain. The information gain may represent how accurately the inputs can classify historical revenue generator data. Both processes may be performed by one of the monitors 120A-N, or any individual capable of determining the proper inputs.

Once the inputs capable of classifying revenue generators 110A-N and a machine learning algorithm best structured for handling the inputs have been identified, the system 100 may move to block 530. At block 530 the classifier model generator 330 may input the processed historical data into the machine learning algorithm to generate a classifier model 340. At block 535 the server 310 may store the classifier model 340.

At block 540 the service provider 130 may collect data associated with a revenue generator, such as the revenue generator A 110A. This data may relate to the aforementioned scores or any other data that may correlate to the behavior of the revenue generator A 110A. The data may be collected by the revenue generator processing component 360, or through another set of servers. If the data is collected through a remote set of servers, the server 310 may mine the data directly from the remote servers.

Once the server 310 has collected new data on a revenue generator, such as the revenue generator A 110A, the system 100 may move to block 560. At block 560 the revenue generator processing component 360 may process the collected data to generate the proper inputs and then the classifier model 340 may classify the processed data. Alternatively or in addition, the revenue generator processing component 360 may process and classify the data for specified time intervals. At block 565 the server 310 may apply a scoring metric 350 to the results of the classifier model 340 to develop a composite score. The scoring metric 350 may be based on any of the aforementioned calculations. Furthermore the scoring metric 350 may associate a range of weights of a given classification with an identifier that may be an alphanumeric character, a symbol, an image, or any other representation that may be useful in converting the classifier results into a format easily understood by the monitors 120A-N or other potential users of the system 100. For instance, the scoring metric 350 may associate weights of the classification "not fraudulent" between 0.8 and 1.0 with 5 stars, 0.6 to 0.8 may be associated with 4 stars, and 0.0 to 0.2 may be associated with 1 star.

Once the server 310 has applied the scoring metric 350 to the classifier model results, the system 100 may move to block 570. At block 570 the server 310 may communicate the composite score of the revenue generator A 110A to a monitor A 120A. In some instances the server 310 may not communicate all composite scores to a monitor A 120A. The monitor A 120A may review the composite score and the other associated scores to determine whether the composite score accurately reflects the behavior of the revenue generator A 110A. The monitor A 120A may also handle the revenue generator A 110A based on the composite score of the revenue generator A 110A. For instance the monitor A 120A may handle the revenue generator A 110A by modifying the security status value of the revenue generator A 110A based on the composite score, such as by changing the security status value to "Offline Fraudulent" if the composite score indicates that the revenue generator A 110A may be likely to commit fraud.

If the monitor A 120A determines that the composite score accurately reflects the behavior of the revenue generator A 110A, then the system 100 may return to block 540 and continue to collect data on the revenue generator A 110A. If the monitor A 120A determines that the composite score does not accurately reflect the behavior of the revenue generator A 110A, the system 100 may move to block 575. At block 575, the monitor A 120A may notify the server 310 that the revenue generator A 110A was scored incorrectly. The monitor A 120A may make this determination by analyzing any currently available scores and data relating to the revenue generator A 110A. Other users may also be able to notify the server 310 or the service provider 130 of an improperly scored revenue generator.

The server 310 may be automatically notified of an improperly scored revenue generator A 110A any time one of the monitors 120A-N or other users changes the security status value of one of the revenue generators 110A-N, such as the revenue generator A 110A.

At block 580 the server 310 may add the data of the revenue generator A 110A to the historical data source 320, along with the correct classification of the data. At block 585 the classifier model generator 330 may generate a new classifier model 340 with the updated historical data. At block 590 the new classifier model 340 may be stored by the server 310. After storing the new classifier model 340 the system 100 may move to block 560 where the revenue generator processing component 360 may reprocess and re-input the data related to the revenue generator A 110A to the classifier model 565. If the monitor A 120A notifies the server 310 that the revenue generator A 110A was again scored incorrectly, the server 310 may need to adjust the inputs to the machine learning algorithm, may need to adjust the scoring metric 350, or may need to select a new machine learning algorithm as elaborated above.

Figure 6:
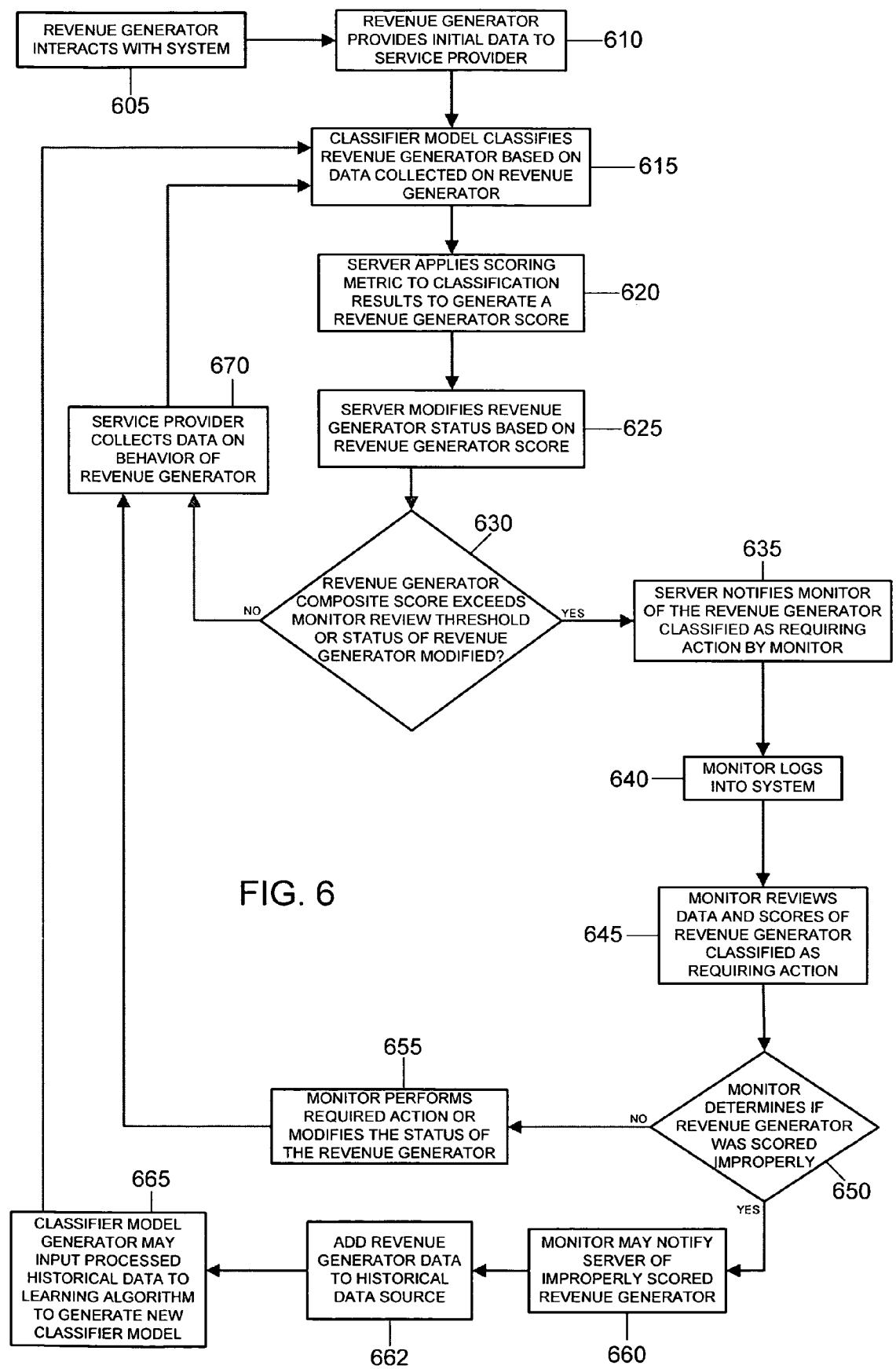
FIG. 6 is a flowchart illustrating steps that may be taken by a revenue generator in the systems of FIG. 1, FIG. 2, and FIG. 3 or other systems for scoring revenue generators.

FIG. 6 illustrates a process that may be taken by one of the revenue generators 110A-N in the systems of FIG. 1, FIG. 2, FIG. 3 or other systems for scoring revenue generators. At block 605 a revenue generator A 110A may interact with the system 100, such as by logging into the system 100. At block 610 the revenue generator A 110A may provide initial data to the service provider 130, such as when the revenue generator A 110A initially signs up for the service. The initial data may include a name, address, credit card number, initial listings, or any other data that may be required by the service provider 130. At block 615, the classifier model 340 may generate an initial classification for the revenue generator A 110A based on the initial data. Alternatively or in addition, the system 100 may not attempt to classify the data associated with the revenue generator A 110A until a certain period of time after the initial sign on of the revenue generator A 110A, or until the service provider 130 has collected a certain amount of data associated with the revenue generator A 110A.

At block 620 the server 310 may apply the scoring metric 350 to the results from the classifier model 340 to generate a composite score for the revenue generator A 110A. At block 625 the server 310 may modify the risk status value or security status value of the revenue generator A 110A based on the composite score of the revenue generator A 110A. The monitor A 120A may set ranges of composite scores that may correspond to the security status values of the revenue generators 110A-N. The monitor A 120A may select an option to have the server 310 automatically change the security status value of the revenue generator A 110A based on the composite score of the revenue generator A 110A. The monitor A 120A may be able to select this option for an individual revenue generator A 110A or across all revenue generators 110A-N. The system 100 may notify the monitor A 120A anytime the security status value or risk status value of a one of the revenue generators 110A-N is modified.

There are several statuses that may be associated with a revenue generator A 110A, such as security status, which may be set by a monitor, and risk status, which may be set by the server 310. The security status may have values such as "Offline Fraudulent," "Online Verified," "Offline Unverified," "Online Verified," "Online High Risk," or "Offline High Risk." The risk status may have values of "Acceptable Online" and "Unacceptable Offline." The server 310 may assign a new revenue generator A 110A with a security status of "Online Unverified" and a risk status of "Offline Unacceptable" by default. If the revenue generator A 110A is assigned one of the "Offline" statuses, then all of the accounts of the revenue generator A 110A may be taken offline or may remain offline. If the revenue generator A 110A is assigned one of the "Online" statuses, then all of the accounts of the revenue generator A 110A may be placed online or may remain online.

At block 630 the server 310 determines whether the score of the revenue generator A 110A drops below a monitor review threshold or whether the status of the revenue generator A 110A was automatically modified by the server 310. The monitor review threshold may be set by the server 310 for all monitors 120A-N or may be set by each individual monitor 120A-N. The monitors 120A-N may select a separate monitor review threshold for each individual revenue generator A 110A they may be associated with, or the monitors 120A-N may set one monitor review threshold for all of the revenue generators 110A-N they may be associated with.

If the composite score of the revenue generator A 110A does not drop below the monitor review threshold and if the server 310 did not modify any statuses of the revenue generator A 110A, then the system 100 may move to block 670 where the service provider 130 may collect additional data on the behavior of the revenue generator A 110A. Upon collecting additional data on the revenue generator A 110A, the system 100 may return to block 615 and reclassify the data associated with the revenue generator A 110A.

If the composite score of the revenue generator A 110A drops below the monitor review threshold or if the server 310 modified one of the statuses of the revenue generator A 110A, then the system 100 may move to block 635 where the server 310 may notify the monitor associated with the revenue generator A 110A, such as the monitor A 120A, that the revenue generator A 110A may require monitor review. The monitor A 120A may log into the system 100 at block 640. At block 645 the monitor A 120A may review the data and scores associated with the revenue generator A 110A. The server 310 may also notify the monitor 120A to review a revenue generator based on random spot checks. For example, the server 310 may select revenue generators 110A-N for monitor review at random intervals.

At block 650 the monitor A 120A may determine whether the revenue generator A 110A was improperly scored. If the monitor A 120A determines that the revenue generator A 110A was properly scored, the system 100 may move to block 655 where the monitor A 120A may perform an action on the account of the revenue generator A 110A, or may modify the security status value of the revenue generator A 110A. The system 100 may then move to block 670 where the service provider 130 may collect additional data on the behavior of the revenue generator A 110A. Upon collecting additional data on the revenue generator A 110A, the system 100 may return to block 615 and reclassify the data associated with the revenue generator A 110A.

If, at block 650, the monitor A 120A determines that the revenue generator A 110A was improperly scored, then the system 100 may move to block 660. At block 660, the monitor A 120A may notify the server 310 of the improperly scored revenue generator A 110A. At block 662, the server 310 may correctly classify the data associated with the revenue generator A 110A and may add the data associated with the revenue generator A 110A to the historical data source 320. At block 665 the classifier model generator 330 may input the new processed historical data to the learning algorithm to generate a new classifier model 340. After generating a new classifier model 340, the system 100 may move to block 615 where the classifier model 340 may re-classify the improperly scored data associated with the revenue generator A 110A.

Figure 7:
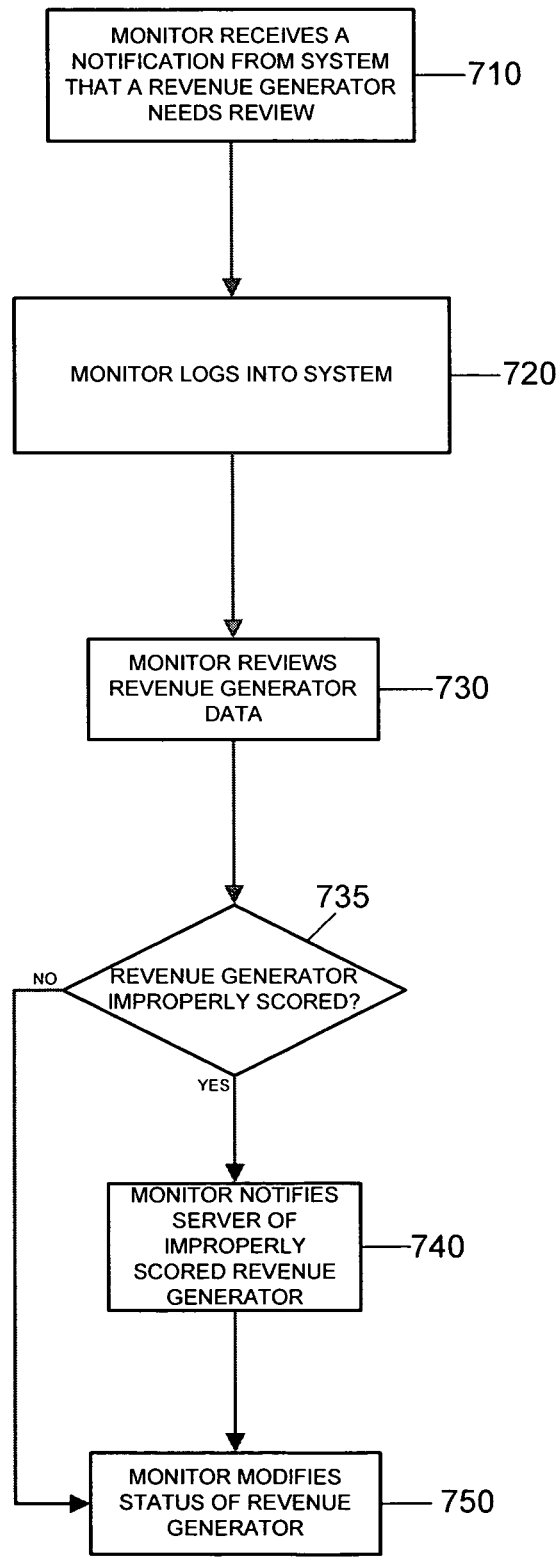
FIG. 7 is a flowchart illustrating steps that may be taken by a monitor in a system for scoring revenue generators.

FIG. 7 illustrates steps that may be taken by a monitor A 120A in a system 100 for scoring revenue generators 110A-N. At block 710 the monitor A 120A may receive a notification from the server 310 that a revenue generator A 110A may need to be reviewed. The server 310 may send this notification if one of the statuses of the revenue generator A 110A has been modified or if the composite score of the revenue generator A 110A drops below a monitor review threshold. At block 720 the monitor A 120A may log into the system 100. At block 730 the monitor A 120A may review the composite score, any additional scores of relevance and any other data that may be associated with the revenue generator A 110A.

At block 735 the monitor A 120A may determine whether the revenue generator A 110A was improperly scored. If the monitor A 120A determines that the revenue generator A 110A was improperly scored, the system 100 may move to block 740. At block 740 the monitor A 120A may notify the server 310 that the revenue generator A 110A was improperly scored. The server 310 may then take the aforementioned steps associated with an improperly scored revenue generator. At block 750 the monitor A 120A may modify the status of the revenue generator A 110A to reflect the composite score and other scores associated with the revenue generator A 110A. If the monitor A 120A determines that the revenue generator A 110A was properly scored, the system 100 may move directly to block 750 where the monitor A 120A may modify the status of the revenue generator A 110A.

FIG. 8 is a screenshot of an implementation of a monitor interface in the systems of FIG. 1, FIG. 2, and FIG. 3 or any other system for scoring revenue generators. The screenshot 800 may include of a view select table 810, a view select submit button 820, a results table 830 and a results submit button 840.

The view select table 810 may display various options the monitor A 120A may select to display the data associated with a revenue generator A 110A. The time view selection may allow the monitor A 120A to select the length of the periods of time to display the data over in the results table 830. The monitor A 120A may also be able to select a range of time to display results over. The algorithm view option may give a monitor A 120A the option to view the results as classified through the current classifier model 340 or to see the results through any other classifier models that have been stored. The view only online accounts option may give the monitor A 120A the option to only view online accounts. Once the monitor A 120A has selected their desired view options in the view select table 810, the monitor A 120A may click the view select submit button 820 to submit the selections to the server 310.

After the monitor A 120A has clicked the view select submit button 820, the results may be displayed to the monitor A 120A, in the results table 830. The results table 830 may display information relating to a specific account of the monitor A 120A, such as client name, the name of the revenue generator A 110A, the account Id, the composite score returned from the scoring metric 350, the age of the account, representing the number of days the revenue generator A 110A has participated in the system 100, the overall status, representing whether the accounts of the revenue generator A 110A are online or offline, a security status option giving the monitor A 120A a method of modifying the status of the revenue generator A 110A, an account search term risk score, a search term max-spend-score, a search term risk-spend score, a search term risk-runRate score, representing the search term risk-run rate score, a max spend over daily budget score, a daily run rate over daily budget score a max card AFS score, and a "View Details" link. The system 100 may be configurable to display any of the data associated with the revenue generators 110A-N to the monitors 120A-N.

The security status dropdown box may contain options relating to the status of the revenue generators 110A-N, such as "online fraudulent," "online verified," "offline unverified," "online high risk," and "offline high risk." The monitors 120A-N may modify the status of any displayed revenue generators 110A-N by modifying the security status dropdown box and clicking the results table submit button 840. The monitor A 120A may obtain detailed information about any of the listed revenue generators 110A-N by clicking on the "View Details" link at the end of the row corresponding to a given revenue generator, such as the revenue generator A 110A.

Figure 9:
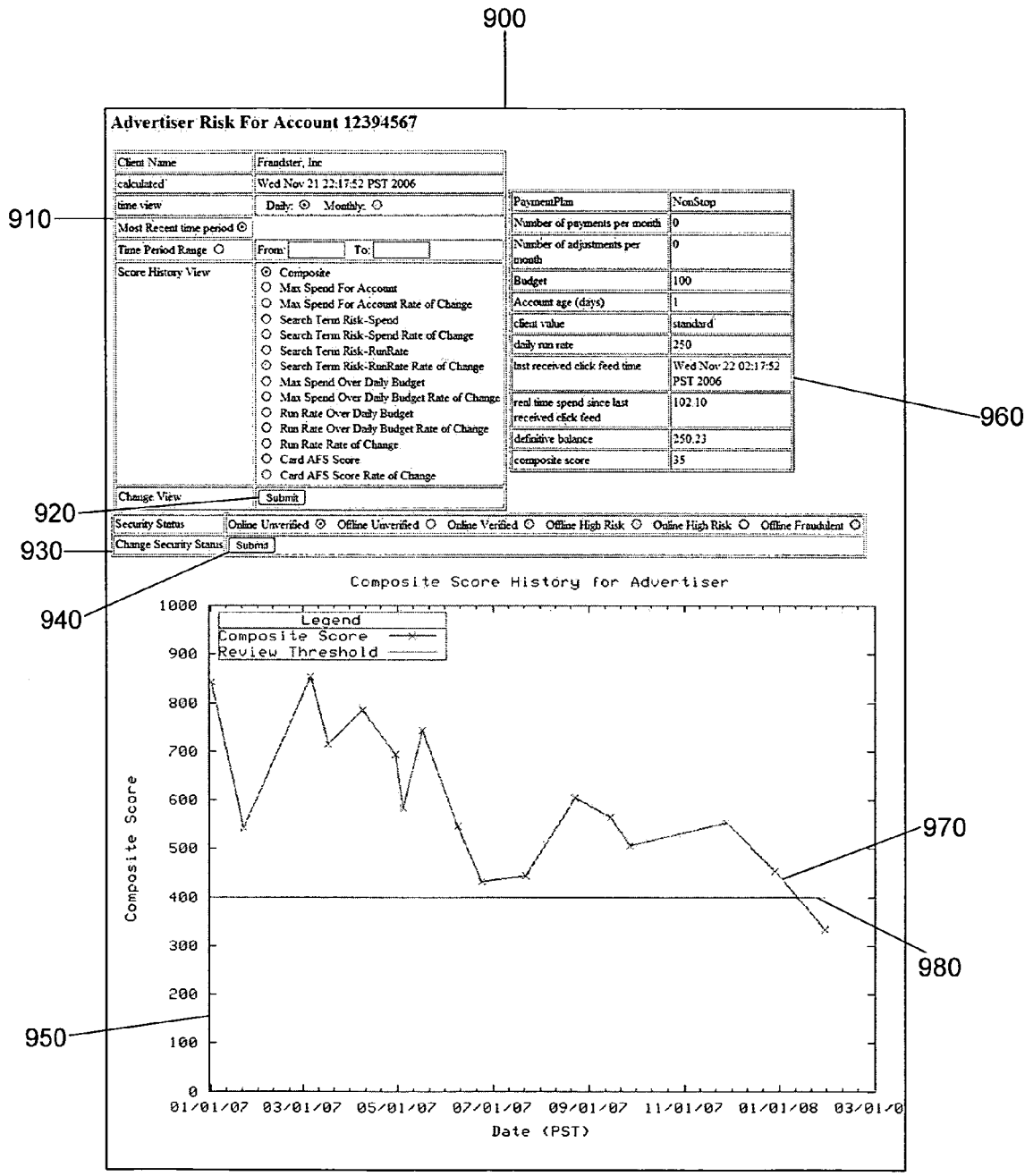
FIG. 9 is a screenshot of an implementation of a monitor interface in the systems of FIG. 1, FIG. 2, and FIG. 3 or other systems for scoring revenue generators.

FIG. 9 is a screenshot of an implementation of a detailed revenue generator account view of a monitor interface in the systems of FIG. 1, FIG. 2, and FIG. 3 or any other system for scoring revenue generators. The screenshot 900 may include a view select table 910, a view select submit button 920, a security status select table 930, a security status submit button 940, a details display table 950, a graph 960, a composite score line 970, and a review threshold line 980.

The view select table 910 may provide the monitor A 120A with options to change the manner in which the data related to the referenced account of the revenue generator A 110A is displayed. The monitor A 120A may be able to select a time view, a time period, and a score history view which may include the option of viewing data relating to any of the aforementioned features of the revenue generator A 110A. The monitor A 120A may modify the view options and may click on the change view submit button 920 to submit the request for a different view of the data to the server 310.

The details display table 950 may display details regarding the revenue generator A 110A and the account of the revenue generator A 110A referenced by the screenshot 900, such as the type of payment plan for the account, the number of payments per month made by the revenue generator A 110A for the account, the number of adjustments per month to the account, the daily budget of the account, the account age, the client tier value, represented as the client value, the daily run rate of the account, the last time a click feed was received for the account, the real time since the last received click feed, which may be displayed in any time metric such as seconds, minutes, hours, or days, the definitive balance of the account and the composite score of the account.

The graph 960 may display the data relating to the options selected by the monitor A 120A in the view select table 910 for the specified period of time. The composite score line 970 may provide information regarding the composite score of the revenue generator A 110A over the time period. The review threshold line 980 may provide information regarding the review threshold for the revenue generators 110A-N. The lines 970, 980 may individually or jointly provide a monitor A 120A with information regarding whether the revenue generator A 110A is a fraudulent revenue generator.

If the monitor A 120A determines that the security status of the revenue generator A 110A needs to be modified, the security status select table 930 may provide the monitor A 120A with a method to modify the security status of the revenue generator A 110A. A monitor A 120A may modify the security status value in the security status select table 930 and then click on the security status submit button 940 to submit the modification to the server 310.

FIG. 10 is a screenshot of the output of a clustering algorithm run on a historical dataset. The clustering algorithm may be a K-means algorithm or some other clustering algorithm. The circled rows may represent centroids indicating a behavior type of several of the revenue generators 110A-N. The data clustering may assist in the feature selection process. If a value of a feature is common to all revenue generators 110A-N of a specific classification, such as a fraudulent revenue generator classification, then the feature may be useful in describing the behavior of the revenue generator.

Figure 11:
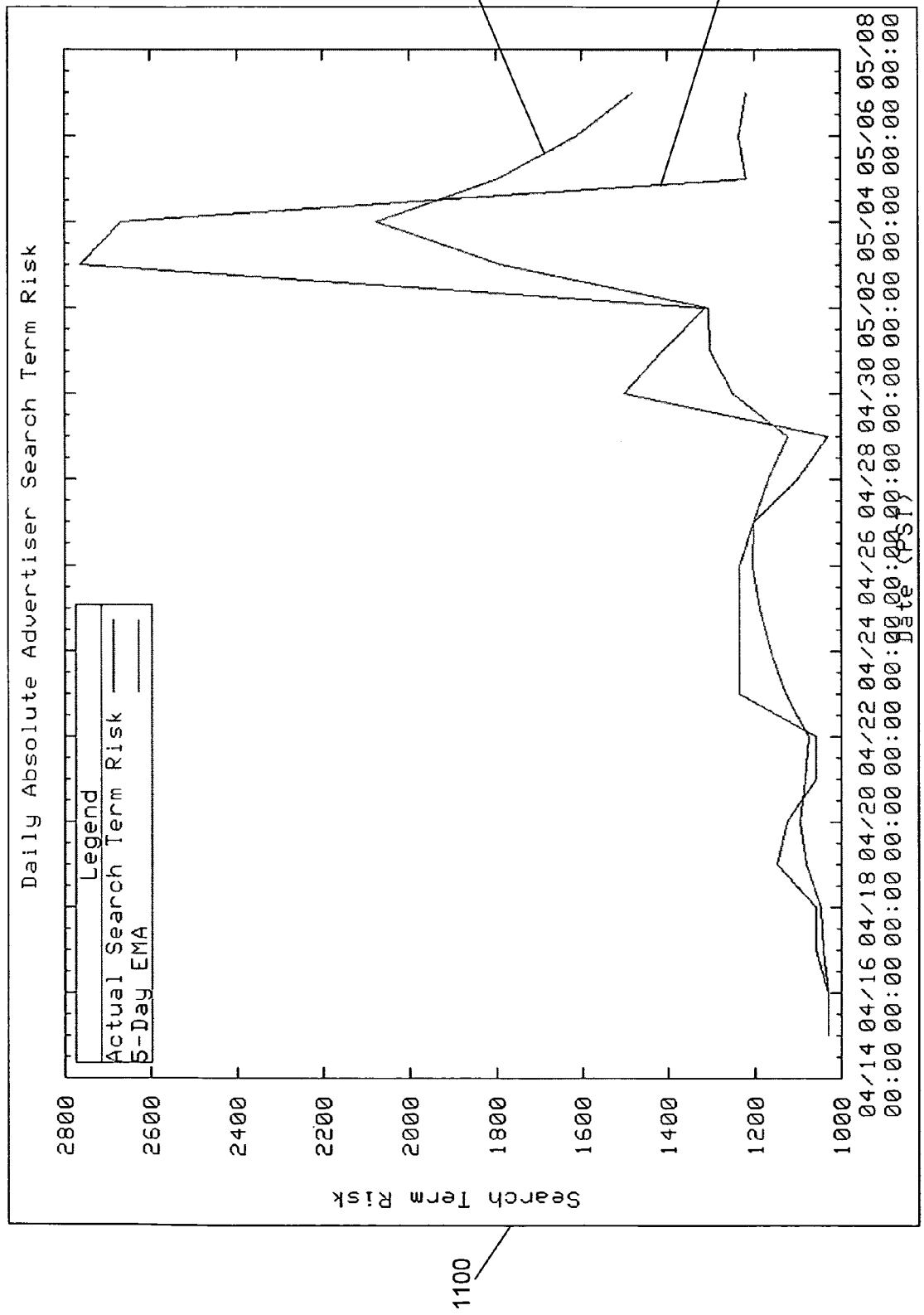
FIG. 11 is a screenshot of a daily absolute advertiser search term risk graph containing daily absolute advertiser search term risk data that may be displayed to a monitor.

FIG. 11 is a screenshot of a daily absolute advertiser search term risk graph 1100 containing daily absolute advertiser search term risk data of one or more revenue generators 110A-N that may be displayed to a monitor A 120A in place of, or in addition to the graph 930 of FIG. 9. The y-axis of the daily absolute search term risk graph 1100 may represent a client search term risk score and the x-axis of the daily absolute search term risk graph 1100 may represent a time value, such as a day. The daily absolute search term risk graph 1100 may contain two lines representing data relating to the daily absolute client search term risk score, a 5-day EMA line 1120 representing a 5 day exponential moving average, and an actual search term risk line 1130.

The 5-day EMA line 1120 may provide the monitor A 120A with information on the 5 day exponential moving average value of the client search term risk of the revenue generator A 110A over the time period. The actual search term risk line 1130 may provide the monitor A 120A with information on the client search term risk score of the revenue generator A 110A over the time period. The lines 1120 and 1130 may individually or jointly provide the monitor A 120A with information regarding whether the revenue generator A 110A is a fraudulent revenue generator.

Figure 12:
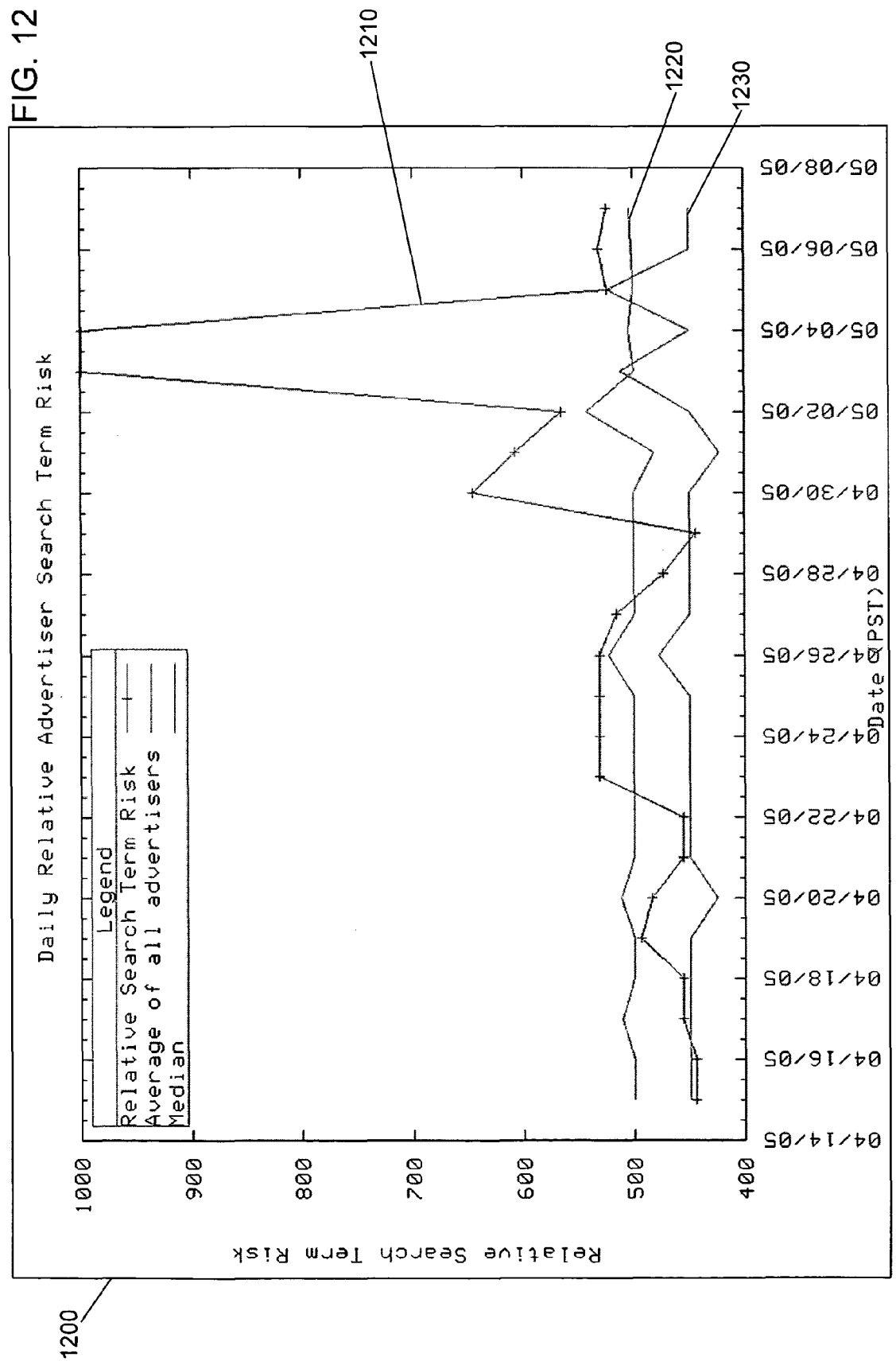
FIG. 12 is a screenshot of a daily relative advertiser search term risk graph containing daily relative advertiser search term risk data that may be displayed to a monitor.

FIG. 12 is a screenshot of a daily relative advertiser search term risk graph 1200 containing daily relative advertiser search term risk data of one or more revenue generators 110A-N that may be displayed to a monitor A 120A in place of, or in addition to the graph 930 of FIG. 9. The y-axis of the daily relative advertiser search term risk graph 1200 may represent a relative client search term risk score and the x-axis of the daily relative advertiser search term risk graph 1200 may represent a time value, such as a day. The daily relative advertiser search term risk graph 1200 may contain three lines representing data relating to the daily relative client search term risk score, a relative search term risk line 1210, an average of all advertisers line 1220, and a median line 1230.

The relative search term risk line 1210 may provide the monitor A 120A with information on the client search term risk score of the revenue generator A 110A over the time period. The average of all advertisers line 1220 may provide the monitor A 120A with information on the average client search term risk score of all of the revenue generators 110A-N over the time period. The median line 1230 may provide the monitor A 120A with information on the median of the client search term risk score for the revenue generators 110A-N over the time period. The lines 1210, 1220, and 1230 may individually or together provide the monitor A 120A with information regarding whether the revenue generator A 110A is a fraudulent revenue generator.

Figure 13:
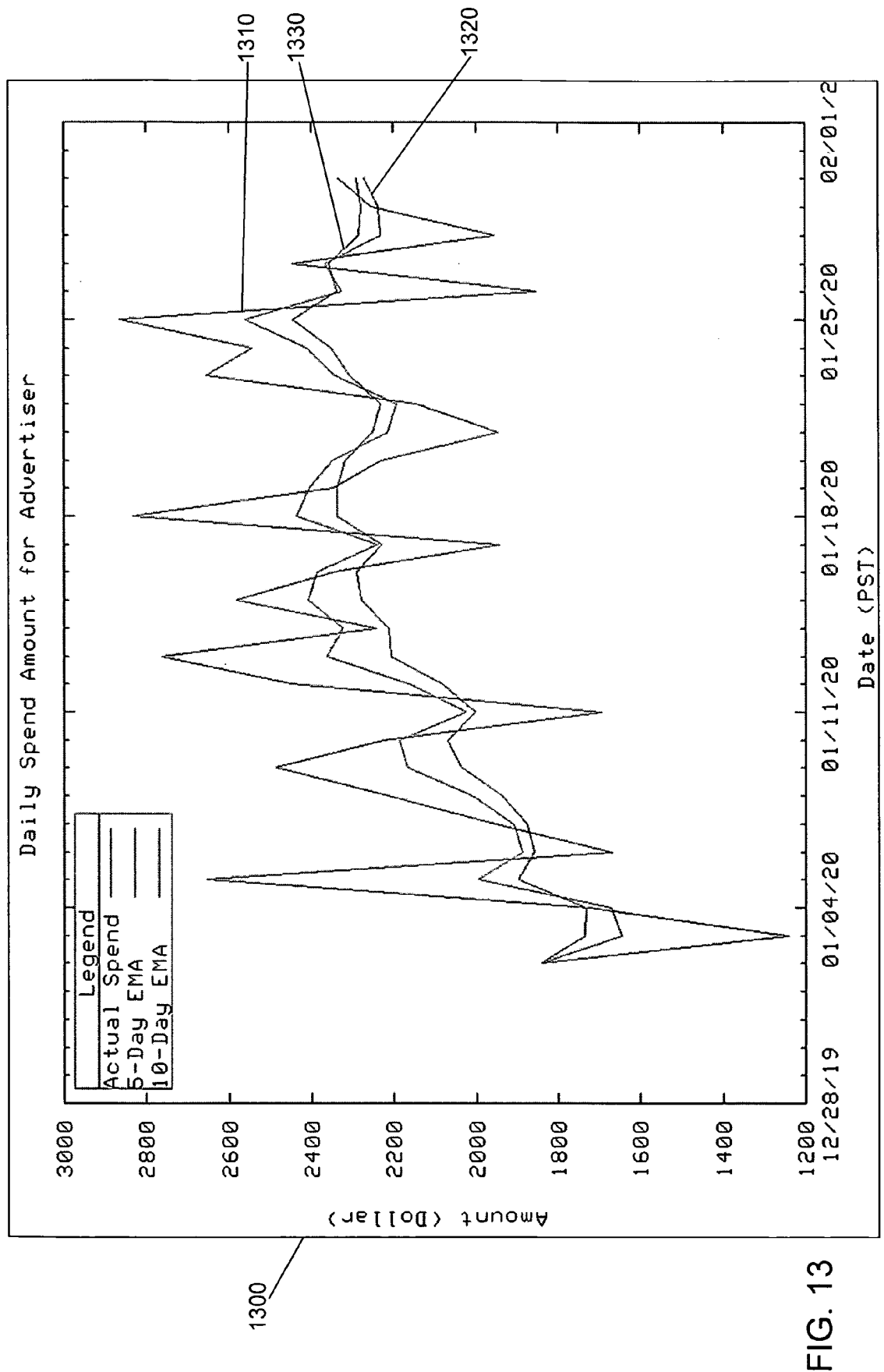
FIG. 13 is a screenshot of a daily spend amount for an advertiser graph containing daily spend amount data for an advertiser that may be displayed to a monitor.

FIG. 13 is a screenshot of a daily spend amount for an advertiser graph 1300 containing daily spend amount data of one or more revenue generators 110A-N that may be displayed to a monitor A 120A in place of, or in addition to the graph 930 of FIG. 9. The y-axis of the daily spend amount for an advertiser graph 1300 may represent an amount, such as a dollar amount and the x-axis of the daily spend amount for an advertiser graph 1300 may represent a time value, such as a day. The daily spend amount for an advertiser graph 1300 may contain three lines representing data relating to the daily spend amount for a revenue generator A 110A, an actual spend line 1310, a 5-day EMA line 1320 representing a 5 day exponential moving average, and a 10-day EMA line 1330 representing a 10 day exponential moving average. Alternatively or in addition to, the advertiser graph may show an EMA for any period of time, which may be specified by a monitor A 120A.

The actual spend line 1310 may provide the monitor A 120A with information on the client spend score of the revenue generator A 110A over the time period, representing the total amount spent by the revenue generator A 110A over the time period. The 5-day EMA line 1320 may provide the monitor A 120A with information on the 5 day exponential moving average value of the client spend score of the revenue generator A 110A. The 10-day EMA line 1330 may provide the monitor A 120A with information on the 10 day exponential moving average value of the client spend score of the revenue generator A 110A. The lines 1310, 1320, and 1330 may individually or jointly provide the monitor A 120A with information regarding whether the revenue generator A 110A is a fraudulent revenue generator.

Figure 14:
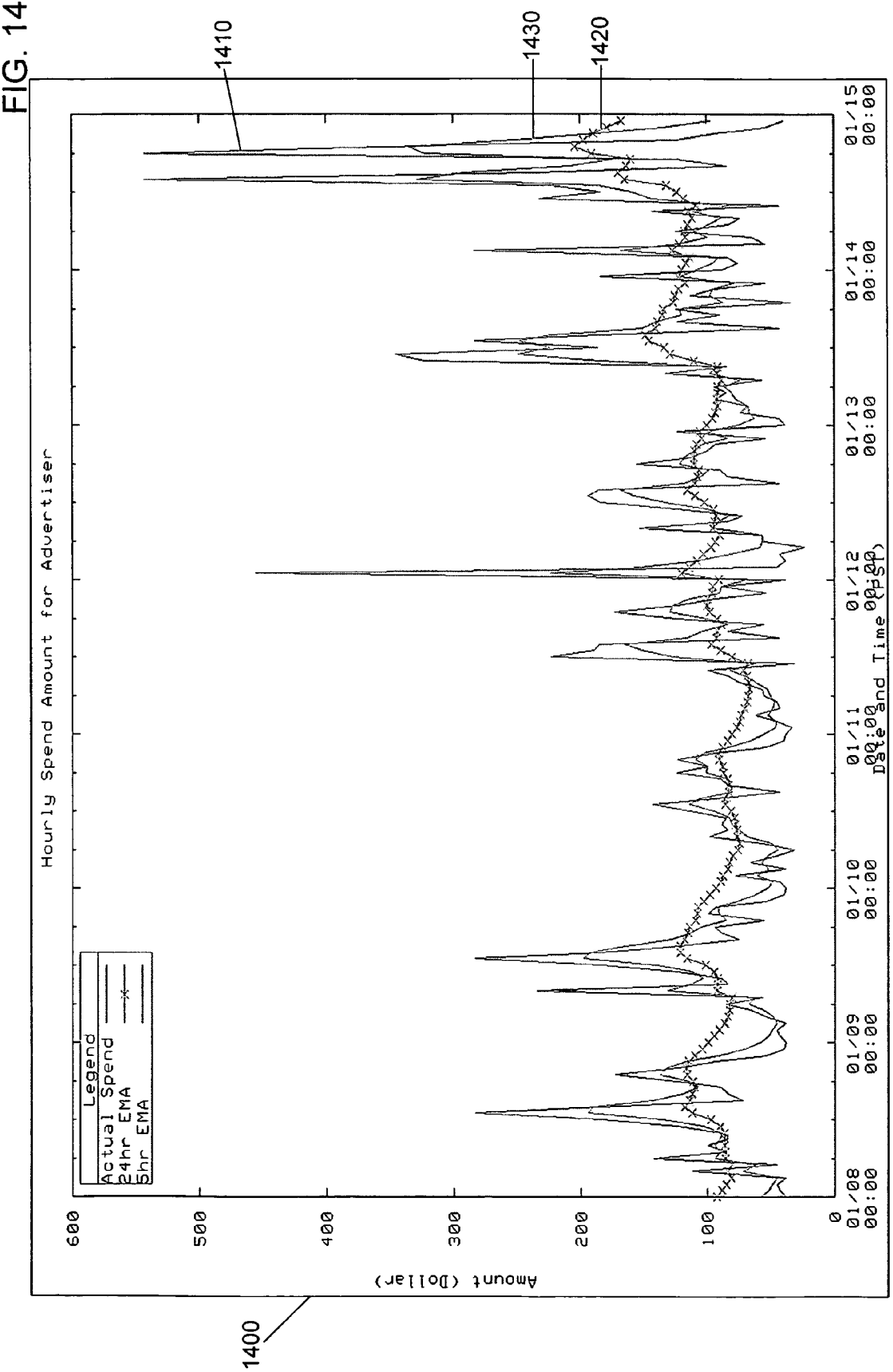
FIG. 14 is a screenshot of an hourly spend amount for an advertiser graph containing hourly spend amount data for an advertiser that may be displayed to a monitor.

FIG. 14 is a screenshot of an hourly spend amount for an advertiser graph 1400 containing daily spend amount data of one or more revenue generators 110A-N that may be displayed to a monitor A 120A in place of, or in addition to the graph 930 of FIG. 9. The y-axis of the hourly spend amount for an advertiser graph 1400 may represent an amount, such as a dollar amount and the x-axis of the hourly spend amount for an advertiser graph 1400 may represent a time value, such as an hour. The hourly spend amount for an advertiser graph 1400 may contain three lines representing data relating to the hourly spend amount for a revenue generator A 110A, an actual spend line 1410, a 24-hour EMA line 1420 representing a 24 hour exponential moving average, and a 5-hour EMA line 1430 representing a 5 hour exponential moving average.

The actual spend line 1410 may provide the monitor A 120A with information on the client spend score of the revenue generator A 110A over the time period, representing the total amount spent by the revenue generator A 110A over the time period. The 24 hour EMA line 1420 may provide the monitor A 120A with information on the 24 hour exponential moving average value of the client spend score of the revenue generator A 110A. The 5 hour EMA line 1430 may provide the monitor A 120A with information on the 5 hour exponential moving average value of the client spend score of the revenue generator A 110A. The lines 1410, 1420, and 1430 may individually or jointly provide the monitor A 120A with information regarding whether the revenue generator A 110A is a fraudulent revenue generator.

Figure 15:
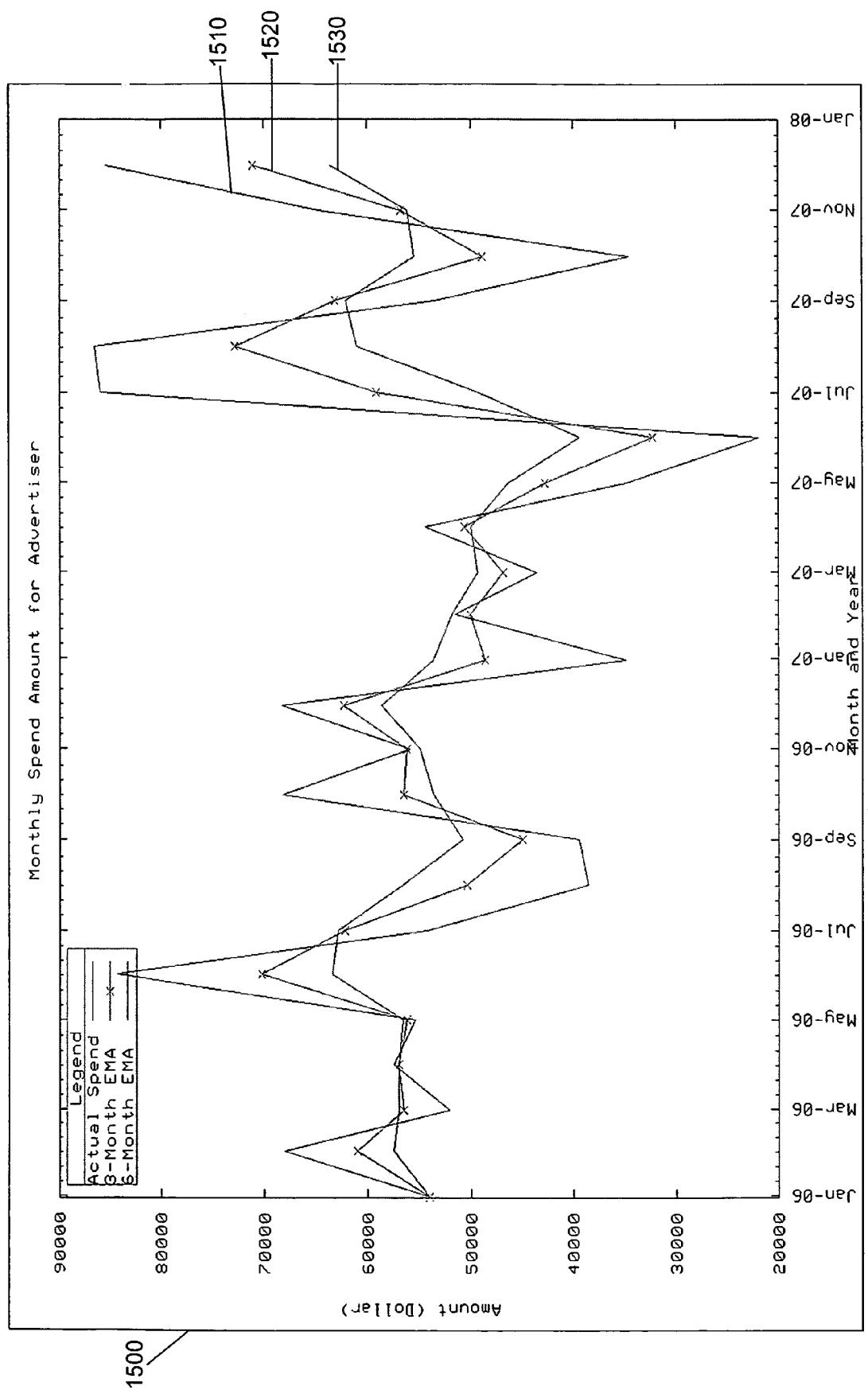
FIG. 15 is a screenshot of a monthly spend amount for an advertiser graph containing monthly spend amount data for an advertiser that may be displayed to a monitor.

FIG. 15 is a screenshot of a monthly spend amount for an advertiser graph 1500 containing daily spend amount data of one or more revenue generators 110A-N that may be displayed to a monitor A 120A in place of, or in addition to the graph 930 of FIG. 9. The y-axis of the monthly spend amount for an advertiser graph 1500 may represent an amount, such as a dollar amount and the x-axis of the monthly spend amount for an advertiser graph 1500 may represent a time value, such as an month. The monthly spend amount for an advertiser graph 1500 may contain three lines representing data relating to the monthly spend amount for a revenue generator A 110A, an actual spend line 1510, a 3-month EMA line 1520 representing a 3 month exponential moving average, and a 6-month EMA line 1530 representing a 6 month exponential moving average.

The actual spend line 1510 may provide the monitor A 120A with information on the client spend score of the revenue generator A 110A over the time period, representing the total amount spent by the revenue generator A 110A over the time period. The 3-month EMA line 1520 may provide the monitor A 120A with information on the 3 month exponential moving average value of the client spend score of the revenue generator A 110A. The 6-month EMA line 1530 may provide the monitor A 120A with information on the 6 month exponential moving average value of the client spend score of the revenue generator A 110A. The lines 1510, 1520, and 1530 may individually or jointly provide the monitor A 120A with information regarding whether the revenue generator A 110A is a fraudulent revenue generator.

Figure 16:
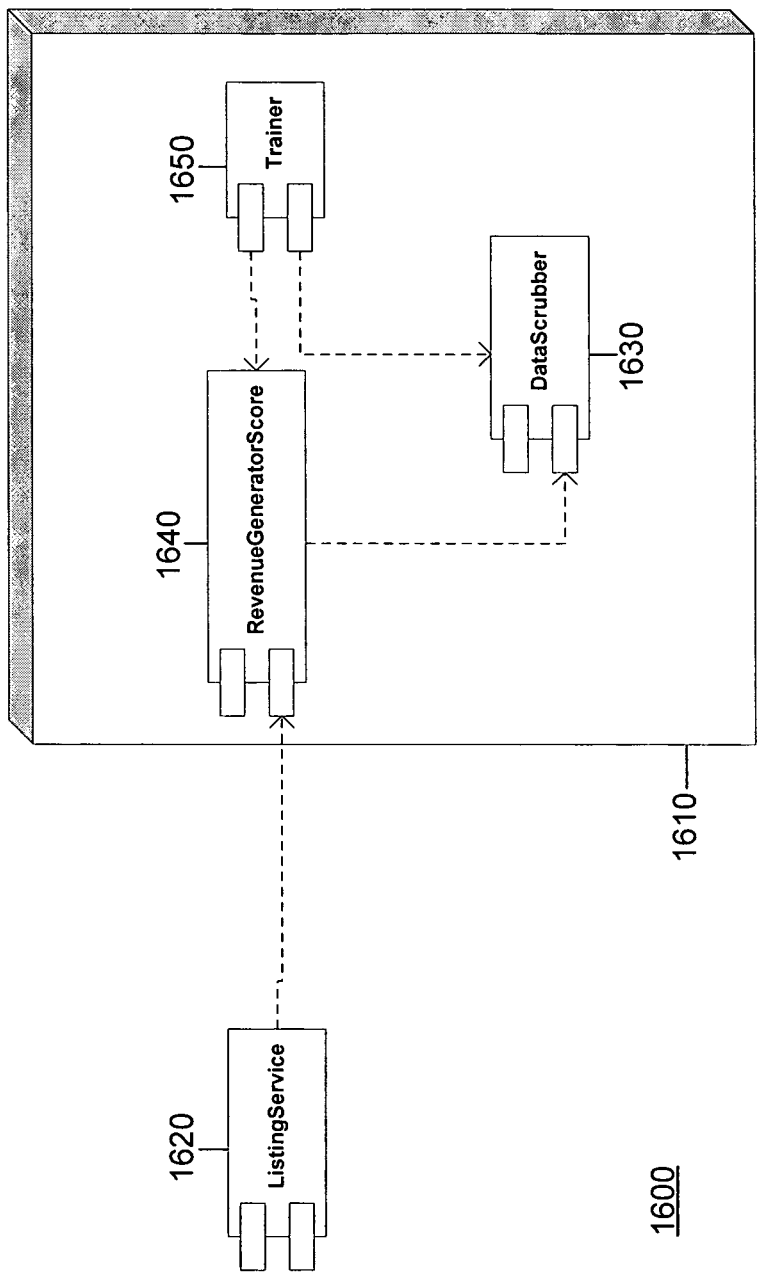
FIG. 16 is a model of an implementation of a system for scoring revenue generators.

FIG. 16 is a component diagram 1600 of an implementation of a system for scoring revenue generators 110A-N. The model 1600 may include a scoring system 1610, and a listing service 1620. The scoring system 1610 may include a data scrubber 1630, a revenue generator score component 1640, and a trainer 1650. The listing service 1620 may provide a user interface or an API that allows a monitor A 120A to see the list of revenue generators 110A-N, particularly the high risk revenue generators 110A-N or the revenue generators 110A-N likely to commit fraud. A third party may use the API to access the scoring system 1610, such as by accessing the scoring system as a monitor. This may allow for additional uses of a system for scoring revenue generators 100 in the future.

The data scrubber 1630 may process the revenue generator data or the historical revenue generator data in order to generate the features or the feature vectors. The data scrubber 1630 may perform aggregation and binning when necessary and may store the processed revenue generator data in temporary tables for processing. The revenue generator score component 1640 may score the revenue generators 110A-N. The revenue generator score component 1640 may take the output of the data scrubber 1630 as input. The revenue generator score component 1640 may rely on the trainer 1650 to train the machine learning algorithm in order to generate a classifier model 340. The trainer 1650 may train the machine learning algorithm on what characteristics represent a high risk revenue generator and what characteristics represent a low risk revenue generator. The trained machine learning algorithm may be the classifier model 340. The training set used may be rows of data from the data scrubber 1630. The each row of data may represent a feature vector. The training data may have been manually identified as high risk revenue generators and low risk revenue generators. The revenue generator score component 1640 may then use the classifier model 340 to score revenue generators 110A-N.

Figure 17:
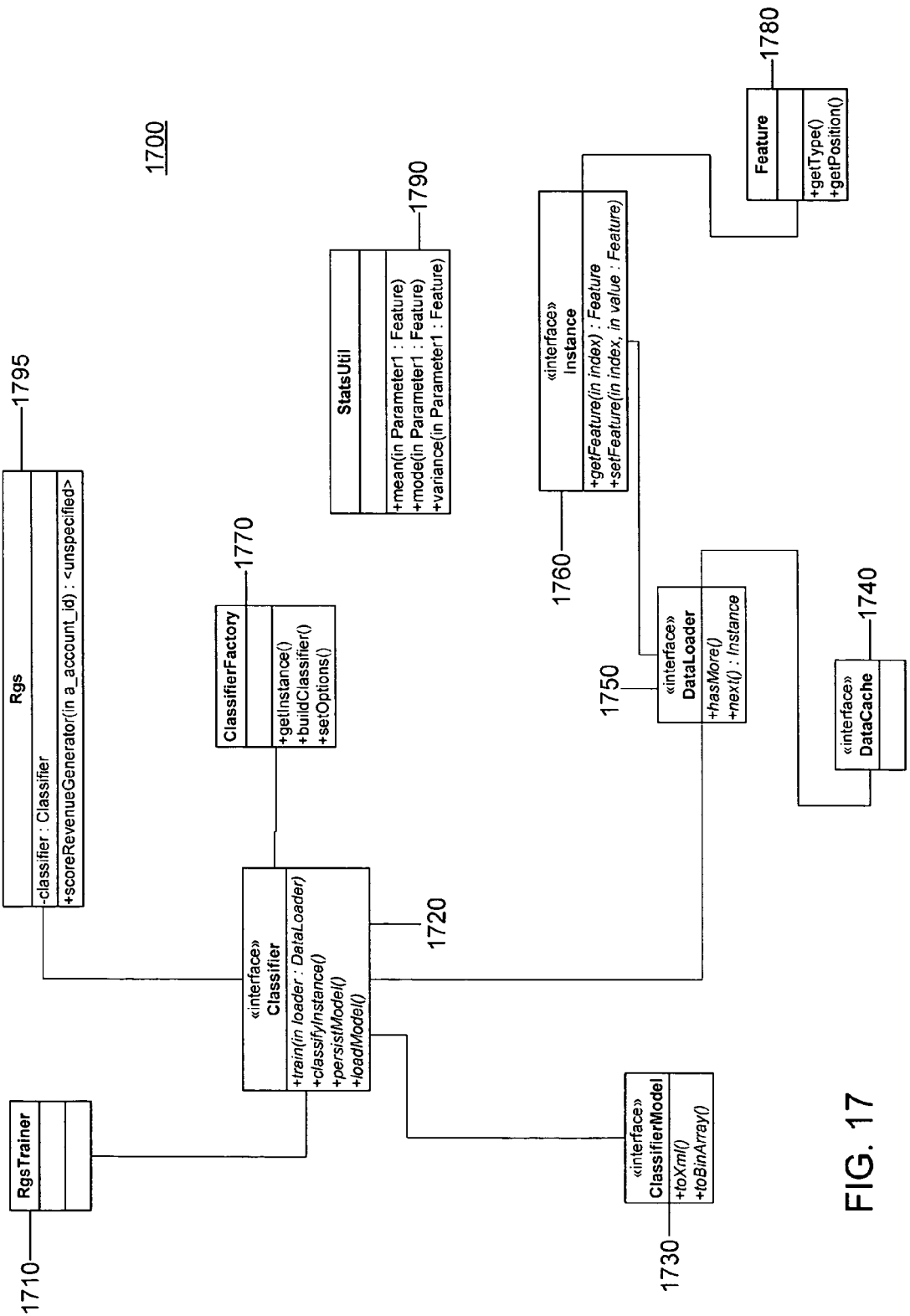
FIG. 17 is a class diagram of an implementation of a system for scoring revenue generators.

FIG. 17 is a class diagram 1700 of an implementation of a system for scoring revenue generators. The class diagram 1700 may contain a trainer 1710, a classifier interface 1720, a classifier model interface 1730, a data cache interface 1740, a data loader interface 1750, an instance interface 1760, a classifier factory 1770, a feature 1780, a stats utility 1790, and a revenue generator scoring component 1795.

The trainer 1710 may be associated with the classifier and may represent a component of the system 100 that utilizes a machine learning algorithm to generate the classifier model 340. The classifier interface 1720 may be associated with the trainer 1710, the classifier factory 1770, the classifier model interface 1730, and the advertiser score 1795. The classifier interface 1720 may have a train method, which takes an instance of the data loader interface 1750 as an input, a classifyInstance method, a persistModel method and a load-Model method.

The train method may utilize the trainer 1710 to generate a classifier model 340. The classifyInstance method may return an instance of the classifier interface 1720, the persistModel method may store the generated classifier model 340, and the loadModel method may load the classifier model 340. The classifier 1720 may contain the basic methods and actions associated with the classifier model 340.

The classifier model interface 1730 may be associated with the classifier interface 1720. The classifier model interface 1730 may have a toXML method and a toBinArray method. The toXML method may convert the data representing the classifier model 340 into XML format. The toBinArray method may convert the data representing the classifier model into a binary array format. The classifier model interface 1730 may implement additional methods and actions that may be used by the classifier model 340.

The classifier factory 1770 may be associated with the classifier 1720. The classifier factory 1770 may implement a getInstance method, a buildClassifier method and a setOptions method. The getInstance method may return an instance of the classifier model 340. The buildClassifier method may generate the classifier model 340. The setOptions method may set options related to the generation of the classifier model 340.

The data cache interface 1740 may be associated with the data loader interface 1750. The data cache interface 1740 may store data associated with the revenue generators 110A-N, the monitors 120A-N, and the classifier model 340.

The data loader interface 1750 may be associated with the data cache interface 1740, the classifier instance 1720, and the instance interface 1760. The data loader interface may have a hasMore method and a next method. The hasMore method may determine if there is any additional data. The next method may output an instance 1760. The data loader interface 1750 may load the data needed by the system 100.

The instance interface 1760 may be associated with the feature 1780 and the data loader interface 1750. The instance interface 1760 may include a getFeature method that takes an index as an input and outputs a feature 1780, and a setFeature method that takes an index, and a feature as inputs. The getFeature method may return a feature 1780 identified by the index. The setFeature method may set the value of the feature 1780. The feature 1780 may be associated with the instance interface 1760. The feature 1780 may represent a feature of the revenue generator data or the feature vector of the revenue generator data.

The stats util 1790 may be a standalone component. The stats util may implement a mean method, a mode method and a variance method. The mean method may compute the mean of a feature 1780. The mode method may compute the mode of a feature 1780. The variance method may compute the variance of a feature 1780. The stats util may be used by one of the monitors 120A-N, or some other user to review data and scores associated with revenue generators 110A-N.

The revenue generator scoring component 1795 may be associated with the classifier interface 1720. The revenue generator scoring component 1795 may be responsible for scoring the revenue generators 110A-N. The revenue generator scoring component 1795 may be associated with an instance of the classifier interface 1720. The revenue generator scoring component 1795 may implement a scoreRevenueGenerator method. The scoreRevenueGenerator method may take an identification variable associated with one of the revenue generators 110A-N, such as a variable associated with the revenue generator A 110A, and may output a score of the revenue generator A 110A.

Figure 18:
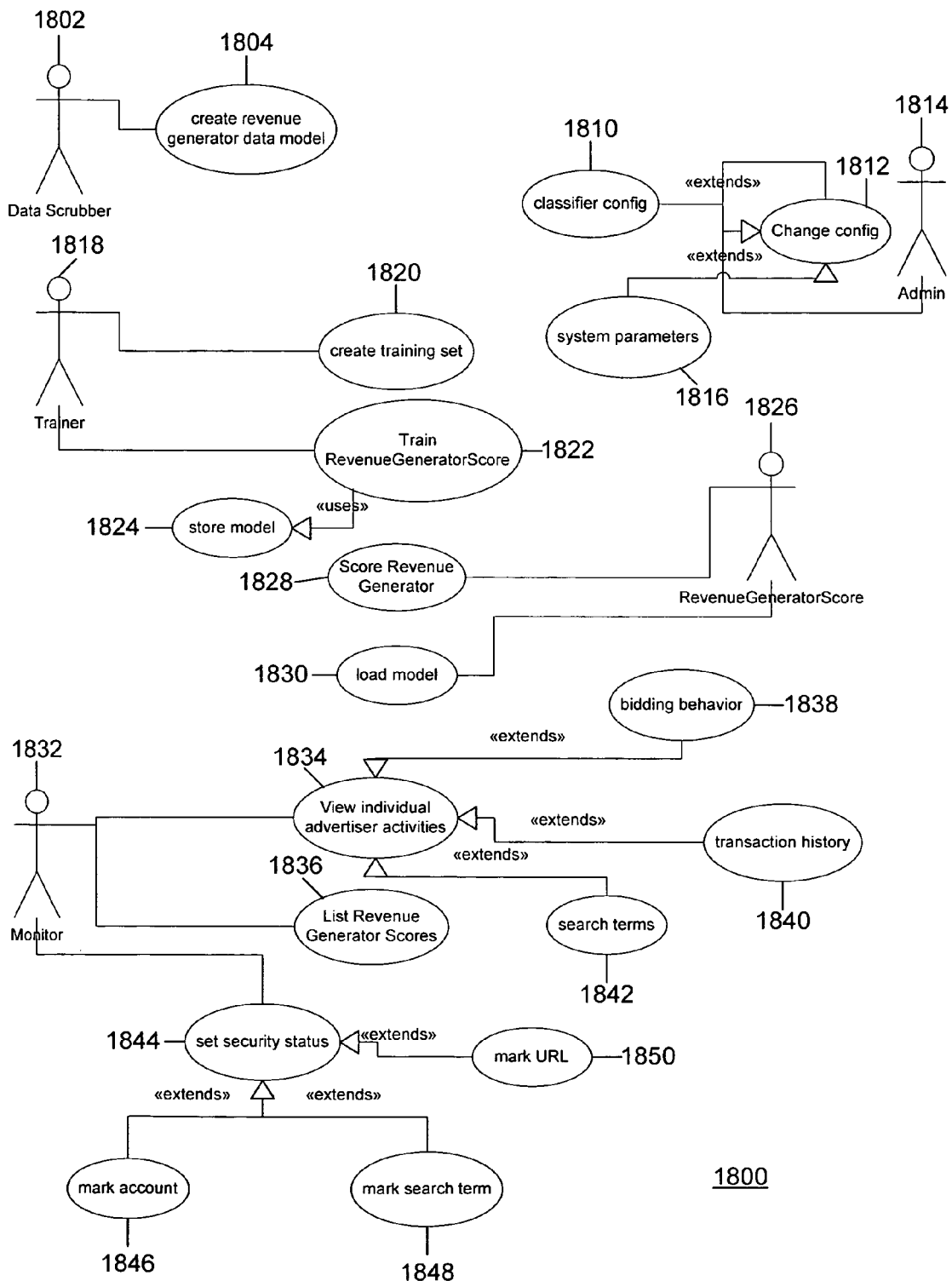
FIG. 18 is a use case of an implementation of a system for scoring revenue generators.

FIG. 18 is a use case 1800 of an implementation of a system for scoring revenue generators. The use case 1800 may include a data scrubber 1802, a trainer 1818, a monitor 1832 a revenue generator score 1826 and an admin 1814.

The data scrubber 1802 may create the revenue generator data model at step 1804. This step may include processing the historical revenue generator data to develop the features or feature vector used to create the classifier model 340. This step may also include processing the data from one of the revenue generators 110A-N once it is collected by the service provider 130.

The trainer 1818 may create a training set at step 1820. The training set may be the set of processed historical data that may be inputted to the machine learning algorithm to create the classifier model 340. The historical data may be processed by the data scrubber 1802 at step 1804 and then may be compiled by the trainer 1818 at 1820. The trainer 1818 may then use the training set including the processed historical data, to train the classifier model 340 at 1822. The trainer 1818 may then store the classifier model 340 at step 1824, in the form of the revenue generator score 1826.

The revenue generator score 1826 may load the classifier model at step 1830 and may score one of the revenue generators 110A-N at step 1828. This step may include applying the classifier model 340 to the data collected by the service provider 130 and processed by the data scrubber 1802.

The monitor 1832 may be one of the monitors 120A-N. The monitor 1832 may view individual activities of the revenue generators 110A-N at 1834. The monitor 1832 may view the bidding behavior of one of the revenue generators 110A-N, such as the revenue generator 110A, at 1838. The monitor 1832 may view the transaction history of the revenue generator 110A at 1840. The monitor 1832 may view the search terms bid on by the revenue generator 110A at 1842. The monitor 1832 may list all of the revenue generator scores at 1836. The monitor 1832 may change the status, or security status, of the revenue generator A 110A at step 1844. The monitor 1832 may change a status associated with a URL, such as mark a specific URL as being associated with a fraudulent revenue generator or ban a URL from being used ever again, at step 1850. The monitor 1832 may modify a status associated with a search term, such as mark a search term as bid on by a fraudulent revenue generator or increase a search term risk score associated with a search term when the search term is used fraudulently at step 1848. The monitor may modify the status of an account or all accounts of one of the revenue generators 110A-N at step 1846.

The admin 1814 may control administrative functions of the system 100. The admin 1814 may be one of the monitors 120A-N, or may be some other person. The admin 1814 may change the configuration of the system 100 at step 1812. At 1810 the admin 1814 may change the configuration of the classifier model 340, or any processes associated with generating the classifier model 340, such as modifying the machine learning algorithm used to generate the classifier model 340. At 1816, the admin 1814 may change parameters of the system 100 as a whole.

Figure 19:
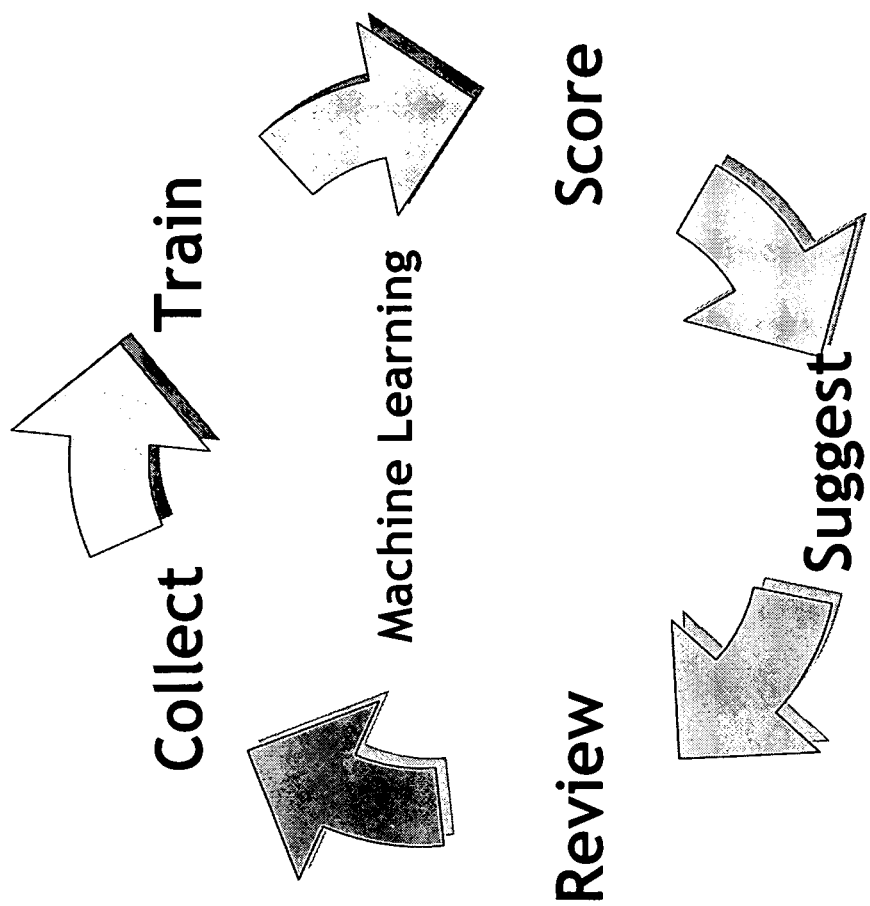
FIG. 19 is a graphic demonstrating the machine learning process that may be used in a system for scoring revenue generators.

FIG. 19 is a graphic demonstrating the machine learning process that may be used in a system for scoring revenue generators 100. FIG. 19 may demonstrate the cycle of the steps involved in the machine learning process. The system 100 may collect historical data on revenue generators 110A-N. The system 100 may train a machine learning algorithm with the historical data, which may result in the generation of a classifier model 340. The system 100 may score new revenue generators 110A-N with the classifier model 340. The system 100 may suggest modifications to the status of the revenue generators 110A-N. One of the monitors 120A-N, such as the monitor A 120A may review the suggestions of the machine learning algorithm or classifier model 340, and may determine whether the revenue generators 110A-N were properly scored. If the monitor A 120A determines that one of the revenue generators 110A-N was improperly scored, the monitor A 120A may take the steps associated with properly classifying the revenue generator data. The reclassified data may then be collected and used to train the machine learning algorithm, which may generate a more accurate classifier model 340.

The revenue generators 110A-N may represent any entities that may generate revenue for the service provider 130, such as advertisers, web content publishers or other partners, auction participants, or generally any entity that may generate revenue for the service provider 130 and may interact with the service provider 130 in a fraudulent manner. The monitors A 120A-N may be human users or may be automated machine users. Any machine learning algorithm may function within the bounds of the system 100 if the machine learning algorithm is capable of classifying a revenue generator A 110A as fraudulent or as not fraudulent.

The system 100 may also be adapted to identify service provider partners, such as publishers, who may be profitable and those who may not be profitable. Publishers may be service provider partners who may serve advertisements of advertisers, supplied to the publishers by the service provider 130, to the users 150. When the users 150 view or click on an advertisement of one of the advertisers, the advertisers may pay the service provider 130. The service provider 130 may then pay the publisher. Thus the service provider partners may also be revenue generators 110A-N.

The system 100 may assist the service provider 130 in identifying which revenue generators 110A-N, such as service provider partners, may be profitable and which may not be profitable. The system 100 may also identify which service provider partners may be profitable for serving a particular advertisement, or a group or category of advertisements, and which service provider partners may not be profitable for serving a particular advertisement or group or category of advertisements. Furthermore, the system 100 may identify which pages on a service provider partner may be more profitable or less profitable for serving a particular advertisement or group or category of advertisements. In this case the system 100 may use some or all of the features identified above, along with one or more additional features relating to a profitable service provider partner or unprofitable service provider partner, to generate the classifier model 330.

The service provider 130 may take actions based on the information provided by the system 100, such as to end the partnership with a service provider partner, serve less advertisements to a service provider partner, serve more advertisements to a service provider partner, or serve specific advertisements, groups of advertisements or categories of advertisements to a service provider partner. Advertisements may be grouped or categorized based on several factors, including demographics, geographic location, industry sectors, or any grouping of advertisements that may be identified as more profitable or less profitable when served by a given service provider partner.

In the case of demographics, the advertisements may be grouped based on the demographics of users 150 who historically click on the advertisements most often. For example, the system 100 may have a grouping of the top fifty advertisements clicked on most often by males ages 18-39. The system 100 may group sites together based on any demographics of users 150 that may be identified as more profitable or less profitable when served by a given service provider partner.

In the case of advertisements grouped together based on a geographic area, the system 100 may group the advertisements that are relevant to a geographic area. The advertisements in the group may refer to advertisers who may physically be located within the geographic area or the advertisements may be relevant to the geographic area based on some other factor.

In the case of advertisements grouped together based on industry sectors, the advertisements included in an industry sector grouping may include the advertisements of any entities involved in the industry sector, the advertisements of trade journals or publications relating to the industry sector, the advertisements of professional organizations related to the industry sector, or any other associated advertisements relating to the industry sector. Advertisements may be grouped under any other category which may be more profitable or less profitable when served by a particular service provider partner.

The illustrations described herein are intended to provide a general understanding of the structure of various embodiments. The illustrations are not intended to serve as a complete description of all of the elements and features of apparatus and processors that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A method for generating scores related to interactions with a service provider partner, comprising:
   identifying a historical dataset describing characteristics of a plurality of service provider partners wherein at least one of the characteristics comprises a profitability of each of the plurality of service provider partners when provided with advertisements of a category of advertisements to serve to users;
   processing the historical dataset to generate a feature vector comprising a combination of at least two variables, wherein the combination of at least two variables for data of a given service provider partner relates to detecting whether the given service provider partner will be profitable when provided with the advertisements of the category of advertisements to serve to the users;

generating a classifier model from the historical dataset and the feature vector, wherein a set of inputs of the generated classifier model comprises the combination of at least two variables of the feature vector;

collecting current service provider partner data representing characteristics of a current service provider partner;

processing the current service provider partner data to generate a current service provider partner data feature vector, wherein the current service provider partner data feature vector comprises the current service provider partner data for the combination of at least two variables; and generating, by a processor, a score for the current service provider partner by applying the classifier model to the current service provider partner data feature vector, wherein the score represents a likelihood that the current service provider partner will be profitable when provided with the advertisements of the category of advertisements to serve to the users.

2. The method of claim 1 wherein generating the classifier model further comprises inputting the historical dataset and the feature vector to a machine learning algorithm to generate the classifier model.

3. The method of claim 2 wherein the machine learning algorithm comprises a decision tree.

4. The method of claim 1 wherein generating the score further comprises:
generating a scoring metric; and
applying the scoring metric to the score generated by applying the classifier model to the current service provider partner data feature vector.

5. The method of claim 4 wherein the scoring metric comprises a multiplier.

6. The method of claim 1 wherein the category of advertisements is based on at least one of demographics of the users, geographic location of the users, or an industry sector related to the advertisements.

7. The method of claim 1 further comprising providing advertisements of a different category of advertisements to the current service provider partner to serve to the users if the score of the current service provider partner indicates the likelihood that the current service provider partner will not be profitable when provided with the category of advertisements to serve to the users.

8. The method of claim 1 further comprising:
modifying the current service provider partner data to include a classification value;
adding the current service provider partner data to the historical dataset;
re-processing the historical dataset to generate an updated feature vector comprising an updated combination of at least two variables, wherein the updated combination of at least two variables for the data of the given service provider partner relates to detecting whether the given service provider partner will be profitable when provided with the advertisements of the category of advertisements to serve to the users; and
re-generating the classifier model from the historical dataset and the feature vector.

9. The method of claim 8 wherein the classification value is indicative of the profitability of the current service provider partner when provided with the advertisements of the category of advertisements.

10. The method of claim 1 wherein the current service provider partner comprises a web publisher.

11. A method of scoring a service provider partner, comprising:
collecting a service provider partner data representing characteristics of a service provider partner;
processing the service provider partner data to generate a service provider partner feature vector comprising a combination of at least two values of the service provider partner data; and
generating, by a processor, a score for the service provider partner indicating a likelihood of the service provider partner being profitable when provided with advertisements of a category of advertisements to serve to users by applying the service provider partner feature vector to a classifier model.

12. The method of claim 11 further comprising:
modifying the service provider partner data to include a classification value, wherein the classification value is indicative of whether the service provider partner was profitable when provided with the advertisements of the category of advertisements;
adding the service provider partner data to a historical service provider partner dataset;
processing the historical service provider partner dataset to generate an updated feature vector comprising an updated combination of at least two variables, wherein the updated combination of at least two variables for data of a given service provider partner is indicative of the likelihood of the service provider partner being profitable when provided with advertisements of the category of advertisements to serve to the users; and
re-generating the classifier model from the historical service provider partner dataset and the updated feature vector.

13. The method of claim 11 wherein the category of advertisements is based on at least one of demographics of the users, geographic location of the users, or an industry sector related to advertisements.

14. The method of claim 11 wherein generating the score further comprises:
generating a scoring metric; and
applying the scoring metric to the score generated by applying the service provider partner feature vector to the classifier model.

15. The method of claim 11 further comprising providing advertisements of a different category of advertisements to the service provider partner to serve to the users if the score of the service provider partner indicates the likelihood that the service provider partner will not be profitable when provided with the category of advertisements to serve to the users.

16. A system for generating scores relating to interactions with a service provider partner, comprising:
a memory to store a classifier model, a historical service provider partner dataset describing characteristics of a plurality of service provider partners, wherein at least one of the characteristics comprises a profitability of each of the plurality of service provider partners when provided with advertisements of a category of advertisements to serve to users, a feature vector, wherein the feature vector comprises a combination of at least two variables of the historical service provider partner dataset, a current service provider data representing characteristics of a current service provider partner and a current service provider partner data feature vector, wherein the current service provider partner data feature vector comprises the current service provider data for the combination of at least two variables;

an interface operatively connected to the memory to collect the current service provider data of the current service provider partner; and a processor operatively connected to the memory and the interface, which processes the historical service provider partner dataset to generate the feature vector, generates the classifier model from the historical service provider partner dataset and the feature vector, processes the current service provider data to generate the current service provider partner data feature vector, and generates a score signifying a likelihood that the current service provider partner will be profitable when provided with the advertisements of the category of advertisements to serve to the users by applying the classifier model to the current service provider partner data feature vector.

17. The system of claim 16 wherein the processor generates a scoring metric and applies the scoring metric to the score generated by applying the classifier model to the current service provider partner data feature vector.

18. The system of claim 16 wherein the profitability of each of the plurality of service provider partners indicates whether each of the service provider partners was profitable when provided with the advertisements of the category of advertisements.

19. The system of claim 18 wherein the processor provides advertisements of a different category of advertisements to the current service provider partner if the score of the current service provider partner indicates the likelihood that the current service provider partner will not be profitable when provided with the category of advertisements to serve to the users.

20. The system of claim 16 wherein the processor modifies the current service provider data to include a classification value indicative of whether the current service provider partner was profitable, adds the current service provider data to the historical service provider partner dataset, re-processes the historical service provider partner dataset to generate an updated feature vector comprising an updated combination of at least two variables, and re-generates the classifier model from the historical service provider partner dataset and the updated feature vector.

21. The system of claim 16 wherein the historical service provider partner dataset comprises data identified as relating to a profitable service provider partner and data identified as relating to a not profitable service provider partner.

* * * * *